(12) United States Patent
Feng et al.

(10) Patent No.: US 10,314,064 B2
(45) Date of Patent: Jun. 4, 2019

(54) APPARATUS AND METHOD FOR SCHEDULING TIMESLOT

(71) Applicant: Huawei Technologies Co., Ltd., Shenzhen (CN)

(72) Inventors: Wei Feng, Beijing (CN); Depeng Jin, Beijing (CN); Dejian Li, Beijing (CN); Jiamin Chen, Beijing (CN); Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 15/200,653

(22) Filed: Jul. 1, 2016

(65) Prior Publication Data

US 2016/0316484 A1 Oct. 27, 2016

Related U.S. Application Data

(63) Continuation of application No. PCT/CN2014/070121, filed on Jan. 3, 2014.

(51) Int. Cl.
*H04W 72/12* (2009.01)
*H04L 1/00* (2006.01)
(Continued)

(52) U.S. Cl.
CPC .......... *H04W 72/1226* (2013.01); *H04L 1/00* (2013.01); *H04W 24/08* (2013.01);
(Continued)

(58) Field of Classification Search
CPC ............................................. H04W 72/1226
See application file for complete search history.

(56) References Cited

U.S. PATENT DOCUMENTS

2006/0040653 A1 2/2006 Ratford et al.
2009/0225712 A1 9/2009 Stamoulis et al.
(Continued)

FOREIGN PATENT DOCUMENTS

CN 1726732 A 1/2006
CN 101971685 A 2/2011
(Continued)

OTHER PUBLICATIONS

Yee et al., "New Techniques-Spatial Frequency Sharing and Bss Management", IEEE 802.11-10/0443r3, pp. 1-20, Institute of Electrical and Electronics Engineers, New York, New York (May 19, 2010).
(Continued)

*Primary Examiner* — Jason E Mattis
(74) *Attorney, Agent, or Firm* — Leydig, Voit & Mayer, Ltd.

(57) ABSTRACT

The present invention discloses an apparatus and a method for scheduling a timeslot. The apparatus includes: a first acquiring module, configured to acquire first interference information; a second acquiring module, configured to acquire second interference information; a third acquiring module, configured to acquire timeslot scheduling information of a link of the at least one second BSS, where the timeslot scheduling information is used to indicate information about a scheduled timeslot of the link of the at least one second BSS; and a scheduling module, configured to schedule a timeslot for a link of the first BSS according to the first interference information, the second interference information, and the timeslot scheduling information. According to the apparatus and the method for scheduling a timeslot in embodiments of the present invention, interference to a link of another network can be avoided actively, and a timeslot can be scheduled properly.

14 Claims, 8 Drawing Sheets

(51) Int. Cl.
*H04W 24/08* (2009.01)
*H04W 72/04* (2009.01)
*H04W 84/12* (2009.01)
*H04W 24/02* (2009.01)

(52) U.S. Cl.
CPC ........ *H04W 72/0446* (2013.01); *H04W 24/02* (2013.01); *H04W 84/12* (2013.01)

(56) References Cited

U.S. PATENT DOCUMENTS

| | | |
|---|---|---|
| 2011/0199966 A1 | 8/2011 | Cordeiro et al. |
| 2012/0207043 A1 | 8/2012 | Geirhofer et al. |
| 2015/0163769 A1* | 6/2015 | Lee ............... H04W 72/04 370/329 |
| 2015/0288427 A1* | 10/2015 | Wang ........... H04W 72/1273 370/329 |
| 2015/0382200 A1 | 12/2015 | Li |
| 2016/0219611 A1* | 7/2016 | Jo ............... H04W 72/046 |
| 2017/0223552 A1* | 8/2017 | Roy ............... H04W 16/14 |

FOREIGN PATENT DOCUMENTS

| | | |
|---|---|---|
| CN | 101360320 B | 11/2011 |
| CN | 103179572 A | 6/2013 |
| CN | 103354663 A | 10/2013 |
| CN | 103404097 A | 11/2013 |
| CN | 103428869 A | 12/2013 |

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications Amendment 3: Enhancements for Very High Throughput in the 60 GHz Band," IEEE Std 802.11ad, pp. i-598, Institute of Electrical and Electronics Engineers, New York, New York (Dec. 28, 2012).
Son et al., "On Frame-Based Scheduling for Directional mmWave WPANs," IEEE INFOCOM, pp. 2149-2157, Institute of Electrical and Electronics Engineers, New York, New York (Mar. 25-30, 2012).

* cited by examiner

APPARATUS AND METHOD FOR SCHEDULING TIMESLOT

CROSS-REFERENCE TO RELATED APPLICATION

This application is a continuation of International Application No. PCT/CN2014/070121, filed on Jan. 3, 2014, which is incorporated herein by reference in its entirety.

TECHNICAL FIELD

The present invention relates to the communications field, and more specifically, to an apparatus and a method for scheduling a timeslot.

BACKGROUND

In short-range wireless communications, a 60 GHz millimeter-wave technology shows great potentiality as spectrum resources are in shortage nowadays. A 60 GHz millimeter wave has advantages of wide bandwidth, high flexibility, high rate up to gigabit level, and short wavelength that facilitates system package miniaturization. At present, the technology is mostly applied to indoor high-definition data stream transfer, gigabit networks, and the like.

When two networks use a same frequency band to perform respective communication, carriers of an unwanted signal and a wanted signal that are received by a user are the same. When an interfering signal is relatively strong, normal communication is affected. Such a phenomenon is referred to as co-channel interference. Bandwidth division at 60 GHz is very limited at present (generally only four channels can be used). When there are many networks, a frequency multiplexing technology needs to be used, which is accompanied by the occurrence of the co-channel interference problem.

The Institute of Electrical and Electronics Engineers (IEEE) 802.11ad standard proposes a clustering mechanism to improve spatial multiplexing and reduce interference. There are two types of clustering mechanisms: centralized and distributed. Each cluster includes a synchronization PBSS control point (Personal Basic Service Set Control Point, PCP) or a synchronization access point (AP), and several member PCPs or APs. Each member PCP or AP in a cluster knows timeslot division of another member PCP or AP, and can schedule its own timeslot so as not to overlap a timeslot of a network on which the another member PCP or AP is located.

The clustering mechanism of the IEEE 802.11ad standard does not provide a scheduling algorithm for scheduling a timeslot on networks with co-channel interference, and a PCP or an AP on each network cannot avoid causing interference to a link of another network.

SUMMARY

Embodiments of the present invention provide an apparatus and a method for scheduling a timeslot, which can avoid causing interference to a link of another network.

According to a first aspect, an apparatus for scheduling a timeslot is provided, where the apparatus includes: a first acquiring module, configured to acquire first interference information, where the first interference information is used to determine whether a link of a first basic service set BSS experiences interference from a link of at least one second BSS; a second acquiring module, configured to acquire second interference information, where the second interference information is used to determine whether a link of the at least one second BSS experiences interference from a link of the first BSS; a third acquiring module, configured to acquire timeslot scheduling information of a link of the at least one second BSS, where the timeslot scheduling information is used to indicate information about a scheduled timeslot of the link of the at least one second BSS; and a scheduling module, configured to schedule a timeslot for a link of the first BSS according to the first interference information, the second interference information, and the timeslot scheduling information, so that a first link of the first BSS and a second link of the at least one second BSS are not interfered with each other when communication is performed in a same timeslot.

With reference to the first aspect, in a first possible implementation manner, the apparatus further includes: a notification module, configured to notify the first interference information to a personal basis service set control point PCP or an access point AP of the at least one second BSS.

With reference to the first possible implementation manner, in a second possible implementation manner, the notification module is further configured to send, to the at least one second BSS, a directional multi-gigabit DMG beacon frame that includes the first interference information.

With reference to the first aspect or either of the foregoing possible implementation manners, in a third possible implementation manner of the first aspect, the scheduling module is configured to: determine, according to the first interference information, the second interference information, and a first timeslot that has been scheduled for a link of the at least one second BSS, at least one candidate link from a link of the first BSS, for which timeslot scheduling has not been performed, where the at least one candidate link and the link of the at least one second BSS, for which the first timeslot has been scheduled, are not interfered with each other; select the first link from the at least one candidate link, where an actual transmission timeslot corresponding to the first link is a longest timeslot that is less than the first timeslot among an actual transmission timeslot corresponding to the at least one candidate link; and schedule a timeslot of the first BSS that overlaps the first timeslot as a timeslot of the first link.

With reference to the first aspect or any one of the foregoing possible implementation manners, in a fourth possible implementation manner, the first BSS is a BSS for which timeslot scheduling is to be performed within current beacon frame duration, the at least one second BSS is a BSS for which timeslot scheduling is performed before the first BSS and for which timeslot scheduling has been performed within the current beacon frame duration, and the scheduling module is specifically configured to: execute the following iteration process for N−1 BSSs in the at least one second BSS until r=N, where an initial value of r is 1: determining, according to the timeslot scheduling information, the $m_r^{th}$ scheduled timeslot of the $r^{th}$ BSS in the N−1 BSSs, where $m_r = M_{r-1}+1, M_{r-1}+2, \ldots, M_r$, $M_r$ is less than or equal to $K_r$, $K_r$ is a quantity of links of the $r^{th}$ BSS, $M_r$ is a quantity of scheduled timeslots of the $r^{th}$ BSS that overlap timeslots of the $N^{th}$ BSS and $M_0=0$, and the $N^{th}$ BSS is the first BSS; determining, according to the first interference information and the second interference information, at least one candidate link from a link of the $N^{th}$ BSS, for which timeslot scheduling has not been performed, where the at least one candidate link and the $m_r^{th}$ link of the $r^{th}$ BSS to the $(N-1)^{th}$ BSS are not interfered with each other; selecting a link with a longest timeslot time from the at least one candidate link as an optimal link, where an actual transmission timeslot corresponding to the optimal link is less than or equal to the $m_r^{th}$ scheduled timeslot; scheduling the $m_r^{th}$ timeslot of the $N^{th}$ BSS as a timeslot of the optimal link, where the $m_r^{th}$ timeslot overlaps the $m_r^{th}$ scheduled timeslot of the $r^{th}$ BSS; and increasing a value of r by 1.

With reference to the fourth possible implementation manner, in a fifth possible implementation manner, if the at least one candidate link does not exist, the scheduling module is further configured to cause the $N^{th}$ BSS not to transmit data in the $m_r^{th}$ scheduled timeslot.

With reference to the fourth possible implementation manner, in a sixth possible implementation manner, the first BSS is a BSS for which timeslot scheduling is to be performed within current beacon frame duration, the at least one second BSS is a BSS for which timeslot scheduling has been performed within the current beacon frame duration, and the scheduling module is specifically configured to: determine, according to the timeslot scheduling information, x overlapping timeslots of the first BSS and the at least one second BSS; and execute the following iteration process until z is greater than x, where an initial value of z is 1: traversing actual transmission timeslots required by y links of the first BSS, for which a timeslot is not scheduled, and scheduling a timeslot for the link of the first BSS according to the first interference information, the second interference information, and the timeslot scheduling information of the link of the at least one second BSS, so that the $p^{th}$ link of the first BSS, on which communication is performed in the $z^{th}$ overlapping timeslot of the x overlapping timeslots and a link of the at least one second BSS, on which communication is performed in the $z^{th}$ overlapping timeslot are not interfered with each other, and an actual transmission timeslot of the $p^{th}$ link of the first BSS is less than or equal to the $z^{th}$ overlapping timeslot; and decreasing a value of y by 1 and increasing a value of z by 1.

With reference to any one of the fourth to the sixth possible implementation manners, in a seventh possible implementation manner, the first scheduling module is further configured to: after the iteration process ends, schedule a timeslot for a remaining link of the first BSS, for which a timeslot is not scheduled, so that transmission is performed according to a random sequence on the remaining link of the first BSS, for which a timeslot is not scheduled.

With reference to the first aspect or any one of the foregoing possible implementation manners, in an eighth possible implementation manner, the apparatus further includes: a sending module, configured to send channel quality measurement request information to a user station STA of the first BSS, where the channel quality measurement request information is used to indicate the STA to perform channel quality measurement within a specified time period; and a first receiving module, configured to receive channel quality measurement report information sent by the STA, where the channel quality measurement report information is used to indicate a measurement result of channel quality of the STA; and the first acquiring module is configured to determine the first interference information according to the measurement result received by the first receiving module.

With reference to the first aspect or any one of the foregoing possible implementation manners, in a ninth possible implementation manner, the apparatus further includes: a second receiving module, configured to receive interference measurement indication information that is sent by a synchronization PCP or a synchronization AP within a cluster to which the first BSS and the at least one second BSS belong, where the interference measurement indication information is used to indicate a PCP or an AP of each of the first BSS and the at least one second BSS to send the channel quality measurement request information to a STA of the respective BSS, and the PCPs or the APs of the first BSS and the at least one second BSS belong to a same cluster.

With reference to the ninth possible implementation manner of the first aspect, in a tenth possible implementation manner, the interference measurement indication information is indicated by a spatial sharing measurement enable field in a clustering control field that is carried in a DMG beacon frame, where the spatial sharing measurement enable field is used to enable a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

With reference to the ninth possible implementation manner of the first aspect, in an eleventh possible implementation manner, the interference measurement indication information is carried in a Media Access Control MAC element, and the MAC element includes a cluster spatial sharing enable field that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

With reference to the first aspect or any one of the foregoing possible implementation manners, in a twelfth possible implementation manner, the second acquiring module is configured to receive the second interference information that is sent by the PCP/AP of the at least one second BSS.

With reference to the first aspect or any one of the foregoing possible implementation manners, in a thirteenth possible implementation manner, the first interference information and the second interference information are SP sharing report elements of a MAC element format, the SP spatial sharing report element includes an interference-free link field, and the interference-free link field includes an identifier of a BSS in which a measured transmission link is located, association addresses of a source STA and a target STA that perform SP transmission, and association addresses of a source STA and a target STA that perform channel quality measurement.

According to a second aspect, an apparatus for scheduling a timeslot is provided, where the apparatus includes: a generating module, configured to generate interference measurement indication information; and a sending module, configured to send the interference measurement indication information to a first BSS and at least one second BSS, where the interference measurement indication information is used to indicate a PCP or an AP of each of the first BSS and the at least one second BSS to send channel quality measurement request information to a STA of the respective BSS, and the PCPs or the APs of the first BSS and the at least one second BSS belong to a same cluster.

With reference to the second aspect, in a first possible implementation manner of the second aspect, the interference measurement indication information is indicated by a spatial sharing measurement enable field in a clustering control field that is carried in a DMG beacon frame, where the spatial sharing measurement enable field is used to enable a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

With reference to the second aspect or the first possible implementation manner of the second aspect, in a second possible implementation manner of the second aspect, the interference measurement indication information is carried in a Media Access Control MAC element, and the MAC element includes a cluster spatial sharing enable field that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

According to a third aspect, a method for scheduling a timeslot is provided, where the method includes: acquiring first interference information, where the first interference information is used to determine whether a link of a first BSS experiences interference from a link of at least one second BSS; acquiring second interference information, where the second interference information is used to determine whether a link of the at least one second BSS experiences interference from a link of the first BSS; acquiring timeslot scheduling information of a link of the at least one second BSS, where the timeslot scheduling information is used to indicate information about a scheduled timeslot of the link of the at least one second BSS; and scheduling a timeslot for a link of the first BSS according to the first interference information, the second interference information, and the timeslot scheduling information, so that the link of the first BSS and the link of the at least one second BSS are not interfered with each other when communication is performed in a same timeslot.

With reference to the third aspect, in a first possible implementation manner, the method further includes: notifying the first interference information to a personal basis service set control point PCP or an access point AP of the at least one second BSS.

With reference to the first possible implementation manner of the third aspect, in a second possible implementation manner, the notifying the first interference information to a personal basis service set control point PCP or an access point AP of the at least one second BSS includes: sending, to the at least one second BSS, a directional multi-gigabit DMG beacon frame that includes the first interference information.

With reference to the third aspect or the first or the second possible implementation manner of the third aspect, in a third possible implementation manner, the scheduling a timeslot for a link of the first BSS according to the first interference information, the second interference information, and the timeslot scheduling information includes: determining, according to the first interference information, the second interference information, and a first timeslot that has been scheduled for a link of the at least one second BSS, at least one candidate link from a link of the first BSS, for which timeslot scheduling has not been performed, where the at least one candidate link and the link of the at least one second BSS, for which the first timeslot has been scheduled, are not interfered with each other; selecting a first link from the at least one candidate link, where an actual transmission timeslot corresponding to the first link is a longest timeslot that is less than the first timeslot among an actual transmission timeslot corresponding to the at least one candidate link; and scheduling a timeslot of the first BSS that overlaps the first timeslot as a timeslot of the first link.

With reference to the third aspect or any one of the foregoing possible implementation manners, in a fourth possible implementation manner, the first BSS is a BSS for which timeslot scheduling is to be performed within current beacon frame duration, the at least one second BSS is a BSS for which timeslot scheduling is performed before the first BSS and for which timeslot scheduling has been performed within the current beacon frame duration, and the scheduling a timeslot for a link of the first BSS according to the first interference information, the second interference information, and the timeslot scheduling information of the link of the at least one second BSS includes: executing the following iteration process for N−1 BSSs in the at least one second BSS until r=N, where an initial value of r is 1: determining, according to the timeslot scheduling information, the $m_r^{th}$ scheduled timeslot of the $r^{th}$ BSS in the N−1 BSSs, where $m_r=M_{r-1}+1, M_{r-1}+2, M_r, M_r$ is less than or equal to $K_r$, $K_r$ is a quantity of links of the $r^{th}$ BSS, $M_r$ is a quantity of scheduled timeslots of the $r^{th}$ BSS that overlap timeslots of the $N^{th}$ BSS and $M_0=0$, and the $N^{th}$ BSS is the first BSS; determining, according to the first interference information and the second interference information, at least one candidate link from a link of the $N^{th}$ BSS, for which timeslot scheduling has not been performed, where the at least one candidate link and the $m_r^{th}$ link of the $r^{th}$ BSS to the $(N-1)^{th}$ BSS are not interfered with each other; selecting a link with a longest timeslot time from the at least one candidate link as an optimal link, where an actual transmission timeslot corresponding to the optimal link is less than or equal to the $m_r^{th}$ scheduled timeslot; scheduling the $m_r^{th}$ timeslot of the $N^{th}$ BSS as a timeslot of the optimal link, where the $m_r^{th}$ timeslot overlaps the $m_r^{th}$ scheduled timeslot of the $r^{th}$ BSS; and increasing a value of r by 1.

With reference to the fourth possible implementation manner of the third aspect, in a fifth possible implementation manner of the third aspect, the method further includes: if the at least one candidate link does not exist, causing the $N^{th}$ BSS not to transmit data in the $m_r^{th}$ scheduled timeslot.

With reference to the third aspect or any one of the foregoing possible implementation manners, in a sixth possible implementation manner, the first BSS is a BSS for which timeslot scheduling is to be performed within current beacon frame duration, the at least one second BSS is a BSS that has scheduled a timeslot within the current beacon frame duration, and the scheduling a timeslot for a link of the first BSS according to the first interference information, the second interference information, and the timeslot scheduling information of the link of the at least one second BSS includes: determining, according to the timeslot scheduling information, x overlapping timeslots of the first BSS and the at least one second BSS; and executing the following iteration process until z is greater than x, where an initial value of z is 1: traversing actual transmission timeslots required by y links of the first BSS, for which a timeslot is not scheduled, and scheduling a timeslot for the link of the first BSS according to the first interference information, the second interference information, and the timeslot scheduling information of the link of the at least one second BSS, so that the $p^{th}$ link of the first BSS, on which communication is performed in the $z^{th}$ overlapping timeslot of the x overlapping timeslots, and a link of the at least one second BSS, on which communication is performed in the $z^{th}$ overlapping timeslot, are not interfered with each other, and an actual transmission timeslot of the $p^{th}$ link of the first BSS is less than or equal to the $z^{th}$ overlapping timeslot; and decreasing a value of y by 1 and increasing a value of z by 1.

With reference to any one of the fourth to the sixth possible implementation manners of the third aspect, in a seventh possible implementation manner, the method further includes: after the iteration process ends, scheduling a timeslot for a remaining link of the first BSS, for which a timeslot is not scheduled, so that transmission is performed according to a random sequence on the remaining link of the first BSS, for which a timeslot is not scheduled.

With reference to the third aspect or any one of the foregoing possible implementation manners, in an eighth possible implementation manner, the acquiring the first interference information includes: sending channel quality measurement request information to a user station STA of the first BSS, where the channel quality measurement request information is used to indicate the STA to perform channel quality measurement within a specified time period; receiving channel quality measurement report information sent by the STA, where the channel quality measurement report information is used to indicate a measurement result of channel quality of the STA; and determining the first interference information according to the measurement result.

With reference to the third aspect or any one of the foregoing possible implementation manners, in a ninth possible implementation manner, PCPs or APs of the first BSS and the at least one second BSS belong to a same cluster, and before the acquiring first interference information, the method further includes: receiving interference measurement indication information that is sent by a synchronization PCP or a synchronization AP within a cluster to which the first BSS and the at least one second BSS belong, where the interference measurement indication information is used to indicate a PCP or an AP of each of the first BSS and the at least one second BSS to send the channel quality measurement request information to a STA of the respective BSS.

With reference to the ninth possible implementation manner of the third aspect, in a tenth possible implementation manner, the interference measurement indication information is indicated by SPSH measurement enable in a clustering control field that is carried in a DMG beacon frame, where the spatial sharing measurement enable field is used to indicate a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

With reference to the ninth possible implementation manner of the third aspect, in an eleventh possible implementation manner, the interference measurement indication information is a Media Access Control MAC element, and the MAC element includes a cluster spatial sharing enable field that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

With reference to the third aspect or any one of the foregoing possible implementation manners, in a twelfth possible implementation manner of the third aspect, the acquiring second interference information includes: receiving the second interference information that is sent by the PCP/AP of the at least one second BSS.

With reference to the third aspect or any one of the foregoing possible implementation manners, in a thirteenth possible implementation manner of the third aspect, the first interference information and the second interference information are SP sharing report elements of a MAC element format, the SP spatial sharing report element includes an interference-free link field, and the interference-free link field includes an identifier of a BSS in which a measured transmission link is located, association addresses of a source STA and a target STA that perform SP transmission, and association addresses of a source STA and a target STA that perform channel quality measurement.

According to a fourth aspect, a method for scheduling a timeslot is provided, where the method includes: generating interference measurement indication information; and sending the interference measurement indication information to a first BSS and at least one second BSS, where the interference measurement indication information is used to indicate a PCP or an AP of each of the first BSS and the at least one second BSS to send channel quality measurement request information to a STA of the respective BSS, and the PCPs or the APs of the first BSS and the at least one second BSS belong to a same cluster.

With reference to the fourth aspect, in a first possible implementation manner of the fourth aspect, the interference measurement indication information is indicated by a spatial sharing measurement enable field in a clustering control field that is carried in a DMG beacon frame, where the spatial sharing measurement enable field is used to indicate a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

With reference to the fourth aspect, in a second possible implementation manner of the fourth aspect, the interference measurement indication information is carried in a Media Access Control MAC element, and the MAC element includes a cluster spatial sharing enable field that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

According to the technical solutions of the present invention, complete interference information about all links of a PCP/AP network in two statuses, that is, the links serve as interfering parties and as interfered-with parties may be acquired, so that inter-network link interference can be avoided when timeslot scheduling is performed, which effectively improves data throughputs of the networks.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The embodiments of the present invention may be applied to a wireless local area network. The wireless local area network may be a BSS (Basic Service Set, basis service set) that includes an access point AP (Access Point, access point), for example, an infrastructure basic service set (Infrastructure BSS). The wireless local area network may be a PBSS (Personal Basic Service Set, personal basis service set) that includes no access point AP, and in this case, an ordinary STA (Station, station) in the PBSS may play a role of a network control point PCP. A PBSS established based on a PCP and a BSS established based on an AP are not differentiated in the embodiments of the present invention, and are collectively referred to as a BSS.

It should be noted that, the technical solutions of the present invention may further be applied to a wireless communications system of another communications standard, such as a TDMA (Time Division Multiple Access) network, a GSM (Global System of Mobile communication, Global System for Mobile Communications) system, a CDMA (Code Division Multiple Access) system, a WCDMA (Wideband Code Division Multiple Access) system, a GPRS (General Packet Radio Service, general packet radio service) system, an LTE (Long Term Evolution) system, an LTE-A (Advanced long term evolution, Long Term Evolution-Advanced) system, or a UMTS (Universal Mobile Telecommunication System), which is not limited in the embodiments of the present invention. However, for ease of description, the wireless local area network is used as an example for description in the embodiments of the present invention.

Figure 1:
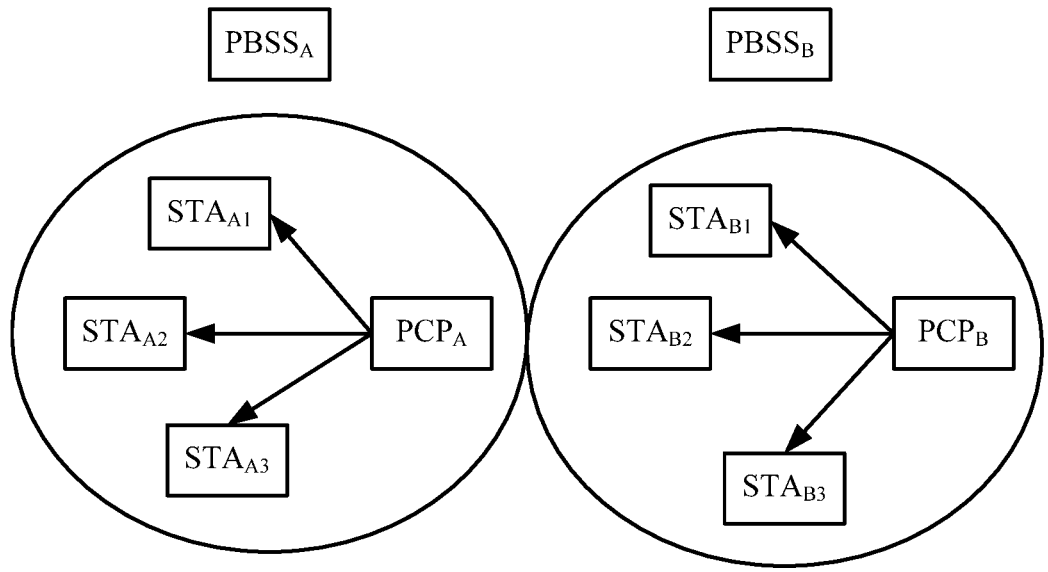
FIG. 1 is a schematic diagram of an application scenario of a communications system for timeslot scheduling according to an embodiment of the present invention.

FIG. 1 is a schematic diagram of an application scenario of a communications system 100 according to an embodiment of the present invention. A PBSS network is used as an example for description in the embodiment of FIG. 1.

In the scenario shown in FIG. 1, there are two intra-frequency networks: $PBSS_A$ and $PBSS_B$. On network A, normal communication is performed between $PCP_A$ and $STA_{A1}$, $STA_{A2}$, and $STA_{A3}$, and on network B, normal communication is performed between $PCP_B$ and $STA_{B1}$, $STA_{B2}$, and $STA_{B3}$. On a PBSS network, a PCP may be, for example, a STA with a control function. When normal communication is performed on each network, interference may be caused to normal communication that is performed on another network. For example, communication or a link between $PCP_A$ and $STA_{A2}$ on network A causes interference to communication or a link between $PCP_B$ and $STA_{B1}$ on network B, and communication or a link between $PCP_B$ and $STA_{B3}$ on network B causes interference to communication or a link between $PCP_A$ and $STA_{A3}$ on network A. In other words, when communication is performed between $PCP_A$ and $STA_{A2}$ on network A, interference is caused to communication between $PCP_B$ and $STA_{B1}$ on network B. If communication is performed on the two links simultaneously, data transmission on network B cannot be normally completed because network B experiences interference.

An apparatus and a method for scheduling a timeslot in the embodiments of the present invention can resolve a problem of co-channel interference in the scenario shown in FIG. 1.

Figure 2:
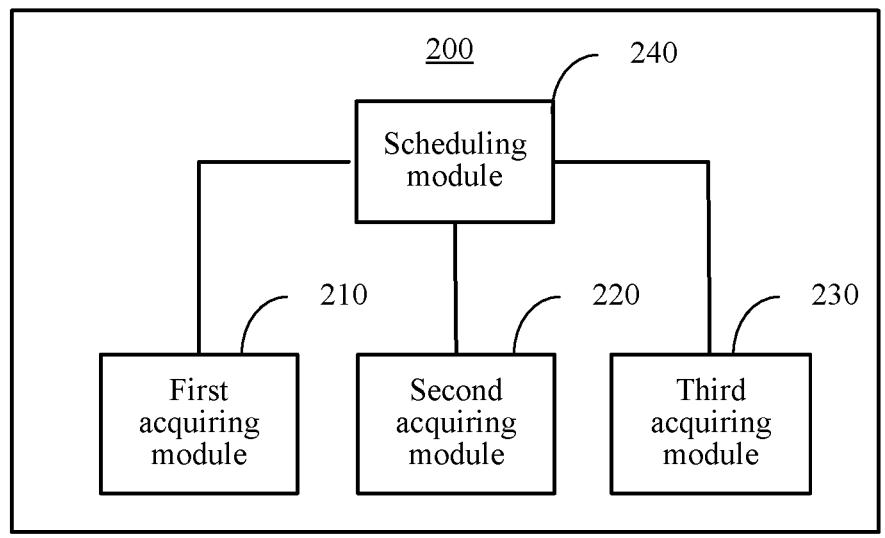
FIG. 2 is a schematic block diagram of an apparatus for scheduling a timeslot according to an embodiment of the present invention.

FIG. 2 is a schematic block diagram of an apparatus 200 for scheduling a timeslot according to an embodiment of the present invention. The apparatus 200 in FIG. 2 is an example of $PCP_A$ or $PCP_B$ in FIG. 1, and detailed description is appropriately omitted herein. For example, the apparatus 200 may be a PCP (for example, a STA with a control function) or an AP. As shown in FIG. 2, the apparatus 200 for scheduling a timeslot includes: a first acquiring module 210, a second acquiring module 220, a third acquiring module 230, and a scheduling module 240.

The first acquiring module 210 is configured to acquire first interference information, where the first interference information is used to determine whether a link/links of a first basic service set BSS experiences interference from a link/links of at least one second BSS.

Specifically, the first interference information may indicate that a link of the first basic service set BSS experiences interference from a link of the at least one second BSS or indicate that a link of the first basic service set BSS experiences no interference from a link of the at least one second BSS. In other words, the first interference information may indicate which links of the first basic service set BSS experience interference from which links of the at least one second BSS or indicate which links of the first basic service set BSS experience no interference from which links of the at least one second BSS.

For example, the first interference information indicates that a first link of the first BSS experiences interference from a second link of the second BSS, or the first interference information indicates that a first link of the first BSS experiences no interference from a second link of the second BSS, so that the second link of the second BSS determines, according to the first interference information, that the second link of the second BSS causes interference or causes no interference to the first link of the first BSS.

The second acquiring module 220 is configured to acquire second interference information, where the second interference information is used to determine whether a link of the at least one second BSS experiences interference from a link of the first BSS.

Specifically, the second interference information may indicate that a link of the first basic service set BSS causes interference to a link of the at least one second BSS or indicate that a link of the first basic service set BSS causes no interference to a link of the at least one second BSS. In other words, the second interference information may indicate which links of the first basic service set BSS cause interference to which links of the at least one second BSS or indicate which links of the first basic service set BSS cause no interference to which links of the at least one second BSS.

For example, the second interference information indicates that the first link of the first BSS causes interference to the second link of the second BSS, or the second interference information indicates that the first link of the first BSS causes no interference to the second link of the second BSS, so that the second link of the second BSS determines, according to the second interference information, that the second link of the second BSS causes no interference or causes no interference to the first link of the first BSS.

The third acquiring module 230 is configured to acquire timeslot scheduling information of a link of the at least one second BSS, where the timeslot scheduling information is used to indicate information about a scheduled timeslot of the link of the at least one second BSS.

In other words, the timeslot scheduling information is used to indicate that, within a preset time period (for example, within a beacon frame of a current to-be-scheduled timeslot), timeslots of which links in links of the foregoing at least one second BSS have been scheduled, or for which link a given timeslot in the second BSS is used as a transmission timeslot, or to which link a given timeslot in the second BSS is allocated and used as a transmission timeslot.

The scheduling module 240 is configured to schedule a timeslot for a link of the first BSS according to the first interference information, the second interference information, and the timeslot scheduling information, so that the link of the first BSS and the link of the at least one second BSS are not interfered with each other when communication is performed in a same timeslot.

For example, in a case in which it is determined according to the first interference information and the second interference information that a link of the first BSS experiences interference from the second link of the second BSS, if a given timeslot has been scheduled for or allocated to the second link of the second BSS, when a timeslot is scheduled for or allocated to the first link of the first BSS, the given timeslot may be evaded so as to avoid causing interference to the second link.

It should be understood that, in this embodiment of the present invention, the first interference information and the second interference information may include identification information of a recipient and a sender using an interfered link, or may include identification information of an interfered link, but this embodiment of the present invention is not limited thereto. For example, the first interference information and the second interference information may further include identification information of a recipient and a sender using an interfering link. The identification information of the recipient and the sender may be addresses of the recipient and the sender. The link may be a communication link between a PCP and a STA or between an AP and a STA on a BSS network, or may be a communication link between STAs. The foregoing same timeslot may be a dedicated communication time period that user equipment (for example, a STA) requests a central device (for example, a PCP or an AP) to allocate to the user equipment. For example, the timeslot may be a service period (SP).

Within the BSS network, the PCP/AP may send a directional channel quality request (Directional Channel Quality Request) and receive a directional channel quality report (Directional Channel Quality Report), so as to obtain information that a link within the network receives interference from another link within the network. With reference to scheduling information sharing in a clustering mechanism, information that a link within the network receives interference from a link of another network may be obtained. However, a status of interference caused by a link within this network to another network cannot be obtained.

Therefore, the apparatus for scheduling a timeslot in this embodiment of the present invention acquires complete interference information about a link of a PCP/AP network in two statuses, that is, the link serves as an interfering party and as an interfered-with party, so that inter-network link interference can be avoided when timeslot scheduling is performed, which effectively improves data throughputs of networks.

It should be understood that, in this embodiment of the present invention, the apparatus 200 may be a PCP or an AP, or may be a synchronization PCP or a synchronization AP, or may be another central device with a scheduling function, which is not limited in this embodiment of the present invention.

Figure 3:
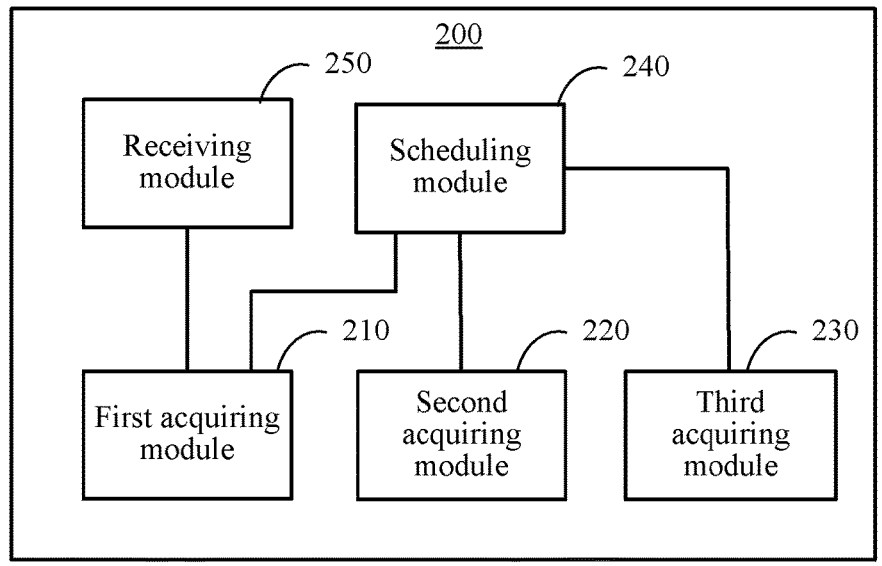
FIG. 3 is a schematic block diagram of an apparatus for scheduling a timeslot according to another embodiment of the present invention.

In this embodiment of the present invention, the first BSS and the at least one second BSS belong to a same cluster. As shown in FIG. 3, the apparatus 200 further includes a second receiving module 250, configured to: before the first module acquires the first interference information, receive interference measurement indication information sent by a synchronization PCP or a synchronization AP within the cluster in which the first BSS and the at least one second BSS are located, where the interference measurement indication information is used to indicate a PCP or an AP of each of the first BSS and the at least one second BSS to send channel quality measurement request information to a STA of the respective BSS, so that the STA performs channel quality measurement within a specified time period.

Figure 4:
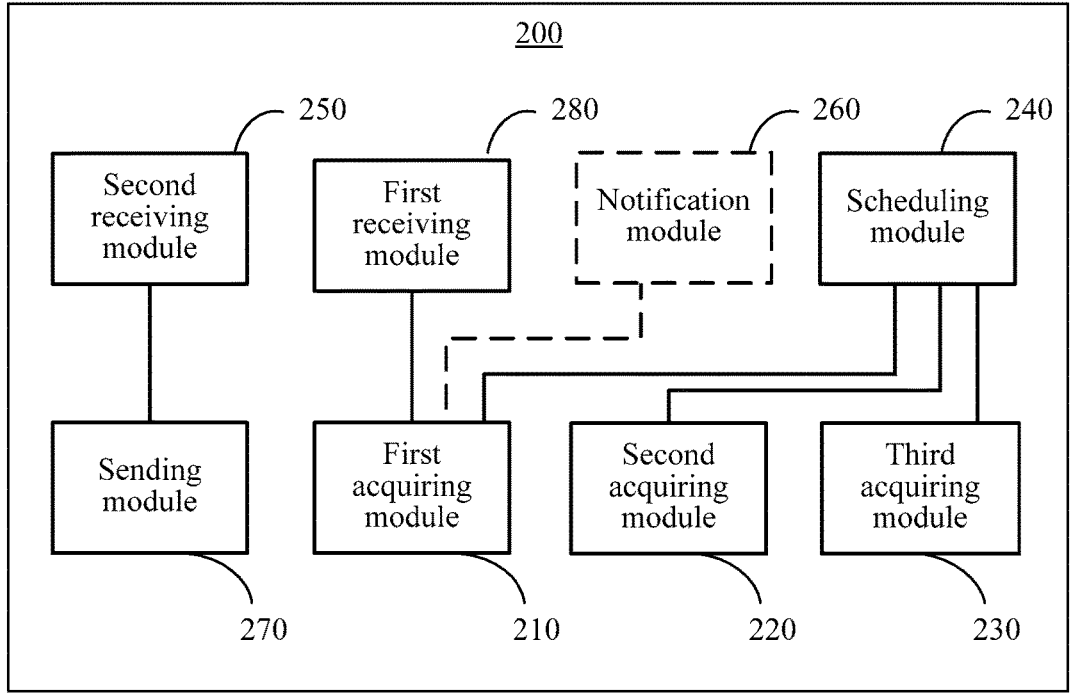
FIG. 4 is a schematic block diagram of an apparatus for scheduling a timeslot according to still another embodiment of the present invention.

Specifically, in this embodiment of the present invention, as shown in FIG. 4, the apparatus 200 further includes:

a sending module 270, configured to send channel quality measurement request information to a user station STA of the first BSS, where the channel quality measurement request information is used to indicate the STA to perform channel quality measurement within a specified time period; and a first receiving module 280, configured to receive channel quality measurement report information sent by the STA, where the channel quality measurement report information is used to indicate a measurement result of channel quality of the STA.

The first acquiring module 210 is configured to determine the first interference information according to the measurement result received by the first receiving module.

In this embodiment of the present invention, after the interference measurement indication information sent by the synchronization PCP or the synchronization AP is received, an inter-BSS interference measurement phase starts. Each network PCP/AP within a cluster freely plans timeslots according to a data requirement of each device, so that a STA transmits data. SPs on different networks cannot overlap in terms of time, that is, within a same SP time period, only one network is allowed to perform SP transmission and another network in the cluster remains silent. The PCP/AP requests, by using a measurement request element (Measurement Request element), the STA within the network to perform directional link quality measurement according to an indicated measurement type and an indicated measurement method, and the STA reports a measurement result to the PCP/AP by using a measurement report element (Measurement Report element). The PCP/AP selects an interference-free link from the measurement result by setting a threshold, and reports the interference-free link to a cluster member by using a clustering mechanism. For example, if the PCP/AP sets the measurement type of the measurement request element to a "directional channel quality request (Directional Channel Quality Request)", and sets the measurement method to an ANIPI (average noise plus interference power indicator), the STA reports, according to the indicated measurement type and the indicated measurement method, by using the measurement report element, directional channel quality obtained by means of measurement to the PCP/AP. The PCP/AP may set an ANIPI threshold. If the measurement result is less than the ANIPI threshold, it is considered that there is no interference on a measured directional channel.

Each interference measurement is initiated by an S-PCP/S-AP within the cluster, and after the interference measurement ends, a PCP of each BSS within the cluster may learn a status of interference caused by another BSS link to links of the PCP/AP network. The S-PCP/S-AP may initiate one interference measurement within the entire cluster at a specific interval T, or may initiate one interference measurement within the cluster when overall link quality within the cluster decreases to a link quality threshold. Each PCP/AP within the cluster begins to indicate a STA in the BSS of the PCP/AP to perform link measurement, and the PCP/AP updates interference link information according to a measurement result of the STA.

In this embodiment of the present invention, the interference measurement indication information is indicated by a spatial sharing (Spacial Sharing, SPSH) measurement enable field in a clustering control field that is carried in a DMG (Directional Multi-Gigabit, directional multi-gigabit) beacon frame, where the SPSH measurement enable field is used to indicate a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

Specifically, in this embodiment of the present invention, a method for setting the SPSH measurement enable field is: when the SPSH measurement enable field is set to 1, it indicates that during time after all member PCPs/APs within the cluster receive the clustering control field, inter-BSS interference measurement may be performed but inter-BSS SP spatial sharing cannot be executed, that is, a time-overlapped SP cannot be scheduled between BSSs; when the SPSH measurement enable field is set to 0, during time after all member PCPs/APs within the cluster receive the clustering control field, inter-BSS interference measurement cannot be performed but inter-BSS SP spatial sharing may be executed, that is, a time-overlapped SP can be scheduled between BSSs.

The clustering control field that carries an SPSH measurement enable indication function may have a format shown in Table 1.

TABLE 1

| | Beacon SP length | Cluster ID | Cluster member role | Maximum quantity of cluster members | SPSH measurement enable |
|---|---|---|---|---|---|
| Bit: | 1 | 1 | 1 | 1 | 1 |

Alternatively, in this embodiment of the present invention, the interference measurement indication information may be carried in a Media Access Control MAC element. The MAC element includes a cluster spatial sharing enable (Cluster Spatial Sharing Enable) field that is used to enable an SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

Specifically, the MAC element is referred to as a cluster interference assessment element (Cluster Interference Assessment element). The cluster spatial sharing enable field is set as follows: when the cluster spatial sharing enable field is set to 1, it indicates that all member PCPs/APs within the cluster may use the SP spatial sharing mechanism between networks, that is, SPs scheduled for neighboring networks are allowed to be time-overlapped; when the cluster spatial sharing enable field is set to 0, it indicates that all member PCPs/APs within the cluster cannot use the SP spatial sharing mechanism between networks, that is, SPs scheduled for neighboring networks are not allowed to be time-overlapped but the member PCPs/APs may request a STA on a network of the member PCPs/APs to perform directional channel measurement. Another value is a reserved value. The cluster interference assessment element may have a MAC frame format shown in Table 2.

TABLE 2

| | Element ID | Length | Cluster spatial sharing enable | Reserved |
|---|---|---|---|---|
| Octet: | 1 | 1 | 1 | 1 |

In this embodiment of the present invention, as shown in FIG. 4, the apparatus 200 further includes: a notification module 260, configured to notify the first interference information to a personal basis service set control point PCP or an access point AP of the at least one second BSS.

For example, the PCP or the AP of the first BSS may send the first interference information to a PCP or an AP of the second BSS, or the PCP or the AP of the first BSS may send the first interference information to a PCP or an AP of the second BSS by using a synchronization PCP or a synchronization AP, which is not limited in this embodiment of the present invention.

Specifically, the notification module 260 is configured to send a DMG beacon frame that includes the first interference information to the at least one second BSS.

In other words, in this embodiment of the present invention, after interference measurement ends, each network PCP/AP in the cluster may notify, by using a DMG beacon frame or an announce frame, another PCP/AP in the cluster of which links or STAs are not interfered on the network of the PCP/AP. In this way, after a period of measurement, each network can obtain complete information about an interfered status of a link of the network and interference caused by the link of the network to another network.

In this embodiment of the present invention, the second acquiring module 220 is specifically configured to receive the second interference information that is sent by the PCP/AP of the at least one second BSS.

Specifically, in this embodiment of the present invention, the first interference information and the second interference information are SP spatial sharing report elements (SP Spatial Sharing Report element) of a MAC element format. The SP spatial sharing report element further includes an interference-free link field, where the interference-free link field includes: an identifier of a BSS in which a measured transmission link is located, association addresses of a source STA (that is, a STA of a link of a measurement party) and a target STA (a link of a measurement party) that perform SP transmission, and association addresses of a source STA and a target STA that perform channel quality measurement.

The spatial sharing list is used to report, to a PCP or an AP of a neighboring network, which links are not interfered with on the network of the PCP or the AP. For example, the report may indicate whether communication or a link between the source STA and the target STA that perform SP transmission interferes with communication or a link between the source STA and the target STA that perform channel quality measurement.

Specifically, in this embodiment of the present invention, the SP spatial sharing report element may have a MAC frame format shown in Table 3. The interference-free link field may have a MAC frame format shown in Table 4.

TABLE 3

| | Element ID | Length | Interference-free link 1 | Interference-free link 2 | ... | Interference-free link n |
|---|---|---|---|---|---|---|
| Octet | 1 | 1 | 12 | 12 | ... | 12 |

Interference-free link ID: An identifier of the interference-free link field;

BSSID: An identifier of a PBSS/BSS in which a measured transmission link is located, that is, a MAC address of a PCP/AP of a measured network;

SP source AID (SP Source AID): An association address of a source STA of an SP;

SP destination AID (SP Destination AID): An association address of a destination STA of an SP;

Measurement source AID (Measurement Source AID): An association address of a source STA that performs link measurement;

Measurement destination AID (Measurement Destination AID): An association address of a destination STA that performs link measurement.

In this embodiment of the present invention, the scheduling module 240 is specifically configured to: determine, according to the first interference information, the second interference information, and a first timeslot that has been scheduled for a link of the at least one second BSS, at least one candidate link from a link of the first BSS, for which timeslot scheduling has not been performed, where the at least one candidate link and the link of the at least one second BSS, for which the first timeslot has been scheduled, are not interfered with each other; select the first link from the at least one candidate link, where an actual transmission timeslot corresponding to the first link is a longest timeslot that is less than the first timeslot among an actual transmission timeslot corresponding to the at least one candidate link; and schedule a timeslot of the first BSS that overlaps the first timeslot as a timeslot of the first link.

In other words, when a timeslot is scheduled, according to acquired complete interference information about all links of a PCP/AP network in two statuses, that is, the links serve as interfering parties and as interfered-with parties, a candidate link that does not cause interference to the link of the first timeslot is selected based on an interference avoidance principle, and a corresponding timeslot with longest data transmission duration is selected from the candidate link based on a greedy principle. This can effectively utilize timeslot transmission time as far as possible, thereby improving effectiveness of spatial multiplexing and a throughput of an overall network.

Specifically, in this embodiment of the present invention, the first BSS is a BSS for which timeslot scheduling is to be performed within current beacon frame duration, the at least one second BSS is a BSS for which timeslot scheduling is performed before the first BSS and for which timeslot scheduling has been performed within the current beacon frame duration, and the scheduling module 240 is specifically configured to:

execute the following iteration process for N−1 BSSs in the at least one second BSS until r=N, where an initial value of r is 1:

determining, according to the timeslot scheduling information, the $m_r^{th}$ scheduled timeslot of the $r^{th}$ BSS in the N−1 BSSs, where $m_r = M_{r-1}+1, M_{r-1}+2, \ldots, M_r$, $M_r$ is less than or equal to $K_r$, $K_r$ is a quantity of links of the $r^{th}$ BSS, $M_r$ is

TABLE 4

| | Interference-free link ID | BSSID | SP source AID | SP destination AID | Measurement source AID | Measurement destination AID | Reserved |
|---|---|---|---|---|---|---|---|
| Octet: | 1 | 6 | 1 | 1 | 1 | 1 | 1 | a quantity of scheduled timeslots of the $r^{th}$ BSS that overlap timeslots of the $N^{th}$ BSS and $M_0=0$, and the $N^{th}$ BSS is the first BSS;

determining, according to the first interference information and the second interference information, at least one candidate link from a link of the $N^{th}$ BSS, for which timeslot scheduling has not been performed, where the at least one candidate link and the $m_r^{th}$ link of the $r^{th}$ BSS to the $(N-1)^{th}$ BSS are not interfered with each other;

selecting a link with a longest timeslot time from the at least one candidate link as an optimal link, where an actual transmission timeslot corresponding to the optimal link is less than or equal to the $m_r^{th}$ scheduled timeslot;

scheduling the $m_r^{th}$ timeslot of the $N^{th}$ BSS as a timeslot of the optimal link, where the $m_r^{th}$ timeslot overlaps the $m_r^{th}$ scheduled timeslot of the $r^{th}$ BSS; and increasing a value of r by 1.

In this embodiment of the present invention, if the at least one candidate link does not exist, the $N^{th}$ BSS is caused not to transmit data in the $m_r^{th}$ scheduled timeslot.

In other words, if a candidate link that meets a condition is not found with respect to a scheduled timeslot of the N−1 BSSs, the $N^{th}$ BSS does not allocate or schedule this scheduled timeslot.

Alternatively, in this embodiment of the present invention, the first BSS is a BSS for which timeslot scheduling is to be performed within current beacon frame duration, the at least one second BSS is a BSS for which timeslot scheduling has been performed within the current beacon frame duration, and the scheduling module 240 may further be specifically configured to:

determine, according to the timeslot scheduling information, x overlapping timeslots of the first BSS and the at least one second BSS; and execute the following iteration process until z is greater than x, where an initial value of z is 1: traversing actual transmission timeslots required by y links of the first BSS, for which a timeslot is not scheduled, and scheduling a timeslot for the link of the first BSS according to the first interference information, the second interference information, and the timeslot scheduling information of the link of the at least one second BSS, so that the $p^{th}$ link of the first BSS, on which communication is performed in the $z^{th}$ overlapping timeslot of the x overlapping timeslots, and a link of the at least one second BSS, on which communication is performed in the $z^{th}$ overlapping timeslot, are not interfered with each other, and an actual transmission timeslot of the $p^{th}$ link of the first BSS is less than or equal to the $z^{th}$ overlapping timeslot; and decreasing a value of y by 1 and increasing a value of z by 1.

Further, in this embodiment of the present invention, the scheduling module 240 is further specifically configured to:

after the iteration process ends, schedule a timeslot for a remaining link of the first BSS, for which a timeslot is not scheduled, so that transmission is performed according to a random sequence on the remaining link of the first BSS, for which a timeslot is not scheduled.

In other words, after scheduling of a to-be-scheduled overlapping timeslot of a BSS and another BSS in a cluster is complete, transmission is performed according to an original random sequence on the remaining to-be-scheduled link of the BSS.

Figure 5:
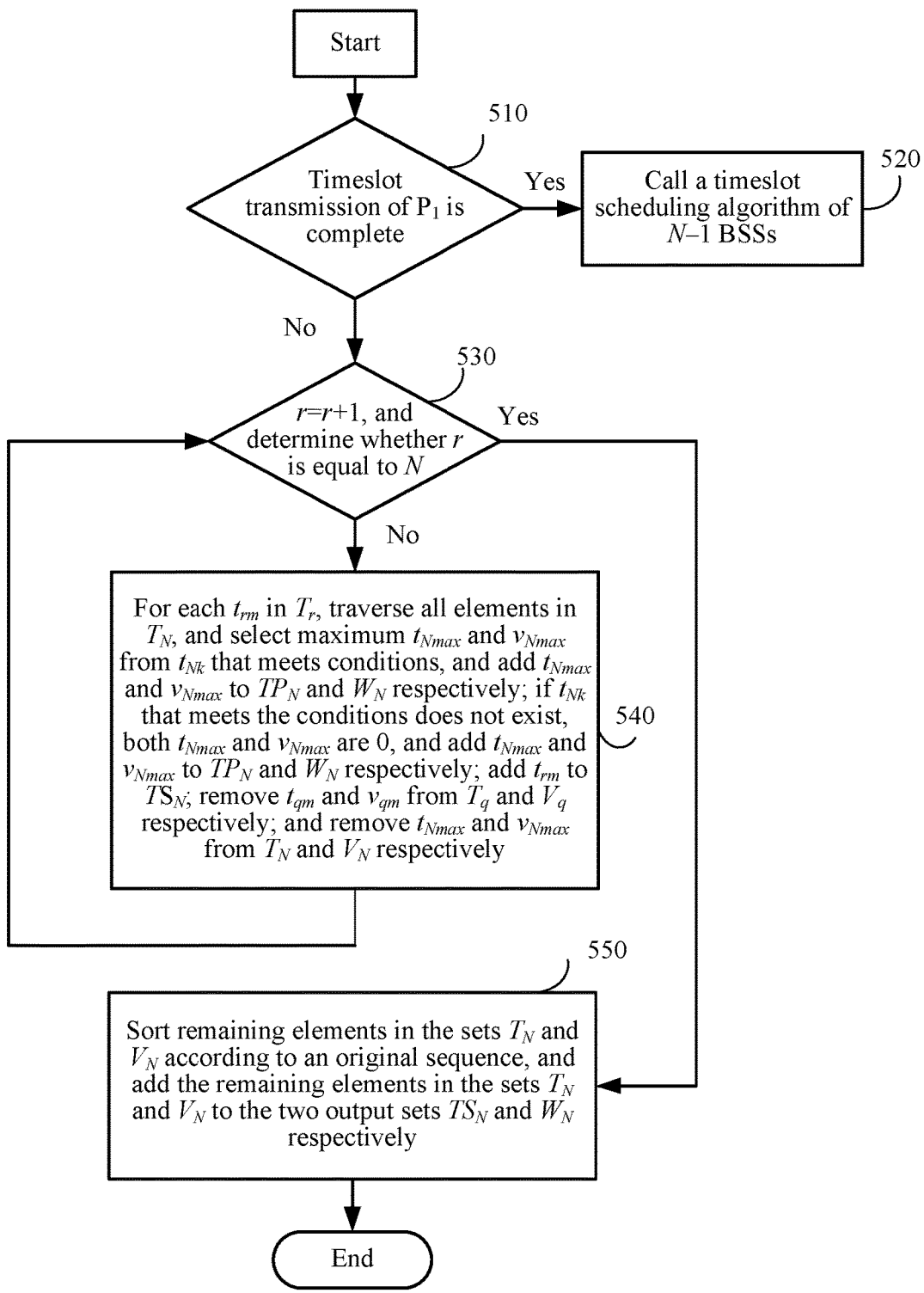
FIG. 5 is a schematic flowchart of a timeslot scheduling process for an apparatus for scheduling a timeslot according to an embodiment of the present invention.

The following details the apparatus of this embodiment of the present invention. With reference to FIG. 5, the following details a process for scheduling a timeslot by the scheduling module 240 of the apparatus 200 according to this embodiment of the present invention.

To be more general, an example in which there are N BSS networks within a cluster is used to detail the process for scheduling a timeslot by the apparatus 200 in this embodiment of the present invention. The networks are respectively labeled as $P_1, P_2, \ldots,$ and $P_N$ according to an access sequence, and each network includes one PCP and several STAs. Quantities of links of networks $P_1, P_2, \ldots,$ and $P_N$ are respectively labeled as $K_1, K_2, \ldots,$ and $K_N$. BI timeslot scheduling of each network is implemented based on latest BIs that have already been scheduled by N−1 networks.

It is assumed that before the network $P_N$ is accessed, BI timeslots of the networks $P_1, P_2, \ldots,$ and $P_{N-1}$ have been scheduled successively, and the following information may be determined:

a transmission time set $T_N$ of the network $P_N$, where $T_N=\{t_{N1}, t_{N2}, \ldots, t_{NK}\}$, K is a quantity of all links that are requested for sending during the BI period within the network $P_N$, and a set element represents transmission time required by a timeslot of each link in the foregoing;

a link number set $V_N$ of the network $P_N$, where $V_N=\{v_{N1}, v_{N2}, \ldots, V_{NK}\}$, and an element $v_{Nk}$ (k=1, 2, ..., K) represents a link number corresponding to a timeslot whose transmission time is $t_{Nk}$;

a transmission time set $T_n$ of network $P_n$ (n=1, 2, ..., N−1), where $T_n=\{t_{n1}, t_{n2}, \ldots, t_{nM_n}\}$, $M_n \leq K_n$, and an element in the set $T_n$ is an occupied time of a scheduled timeslot of a network $P_n$ (n=1, 2, ..., N−1), where starting time of BI of the network $P_N$ is used as a point for the element in the set $T_n$; and a link number set $V_n$ of the network $P_n$ (n=1, 2, ..., N−1), where $V_n=\{v_{n1}, v_{n2}, \ldots, v_{nM_n}\}$, and each element represents a link number corresponding to transmission time at a corresponding location in the set $T_n$.

According to the received SP spatial sharing report element that is carried in the DMG beacon frame, the following information may be determined:

interference matrices between the network $P_n$ (n=1, 2, ..., N−1) and the network $P_N$: $ICI_{P_n2P_N}$ and $ICI_{P_N2P_n}$, where $ICI_{P_n2P_N}$ represents interference caused by another network $P_n$ to the network $P_N$, and $ICI_{P_N2P_n}$ represents interference caused by the network $P_N$ to the network $P_n$. The interference matrices are obtained by means of training. For example, elements of the matrix $ICI_{P_n2P_N}$ are defined as follows:

$$ICI_{P_n2P_N}(i,j) = \begin{cases} 1, \text{when a } PCP \text{ communicates with } STA_i \text{ on} \\ \text{the network } P_n, \text{communication between a } PCP \text{ and} \\ STA_j \text{ on the network } P_N \text{ receives interference} \\ 0, \text{when a } PCP \text{ communicates with } STA_i \text{ on} \\ \text{the network } P_n, \text{communication between a } PCP \text{ and } STA_j \\ \text{on the network } P_N \text{ receives no interference} \end{cases}$$

where i=1, 2, ..., $K_n$; j=1, 2, ..., $K_N$. In addition, $ICI_{P_n2P_N}(i,j)=0$ (i=0 or j=0).

Similarly, it may be known that a definition of the matrix $ICI_{P_N2P_n}$ is as follows:

$$ICI_{P_N2P_n}(i,j) = \begin{cases} 1, \text{when a } PCP \text{ communicates with } STA_i \\ \text{on the network } P_N, \text{communication between a } PCP \text{ and} \\ STA_j \text{ on the network } P_n \text{ receives interference} \\ 0, \text{when a } PCP \text{ communicates with } STA_i \\ \text{on the network } P_N, \text{communication between a } PCP \text{ and} \\ STA_j \text{ on the network } P_n \text{ receives no interference} \end{cases}$$

where i=1, 2, ..., $K_N$, j=1, 2, ..., $K_n$. In addition, $ICI_{P_N2P_n}(i,j)=0$ (i=0 or j=0).

In this case, an initial value of a variable r is set to 0. As shown in FIG. 5, the process for scheduling a timeslot by the scheduling module 240 of the apparatus 200 according to this embodiment of the present invention is as follows:

510. Determine whether transmission in a timeslot on a network $P_1$ completes when a network $P_N$ is accessed, that is, whether a set $T_1$ is an empty set. If the set $T_1$ is an empty set, execute step 520; if the set $T_1$ is an empty set, execute step 530.

520. When transmission is complete on the network $P_1$, call a method for scheduling a timeslot in a system that includes N−1 networks ($P_2, P_3, \ldots, P_N$) to perform timeslot scheduling on the network $P_N$, and end the scheduling.

530. Increase a value of r by 1 (r←r+1), and determine whether r is less than N. If yes, execute step 540; otherwise, execute step 3.

Figure 6:
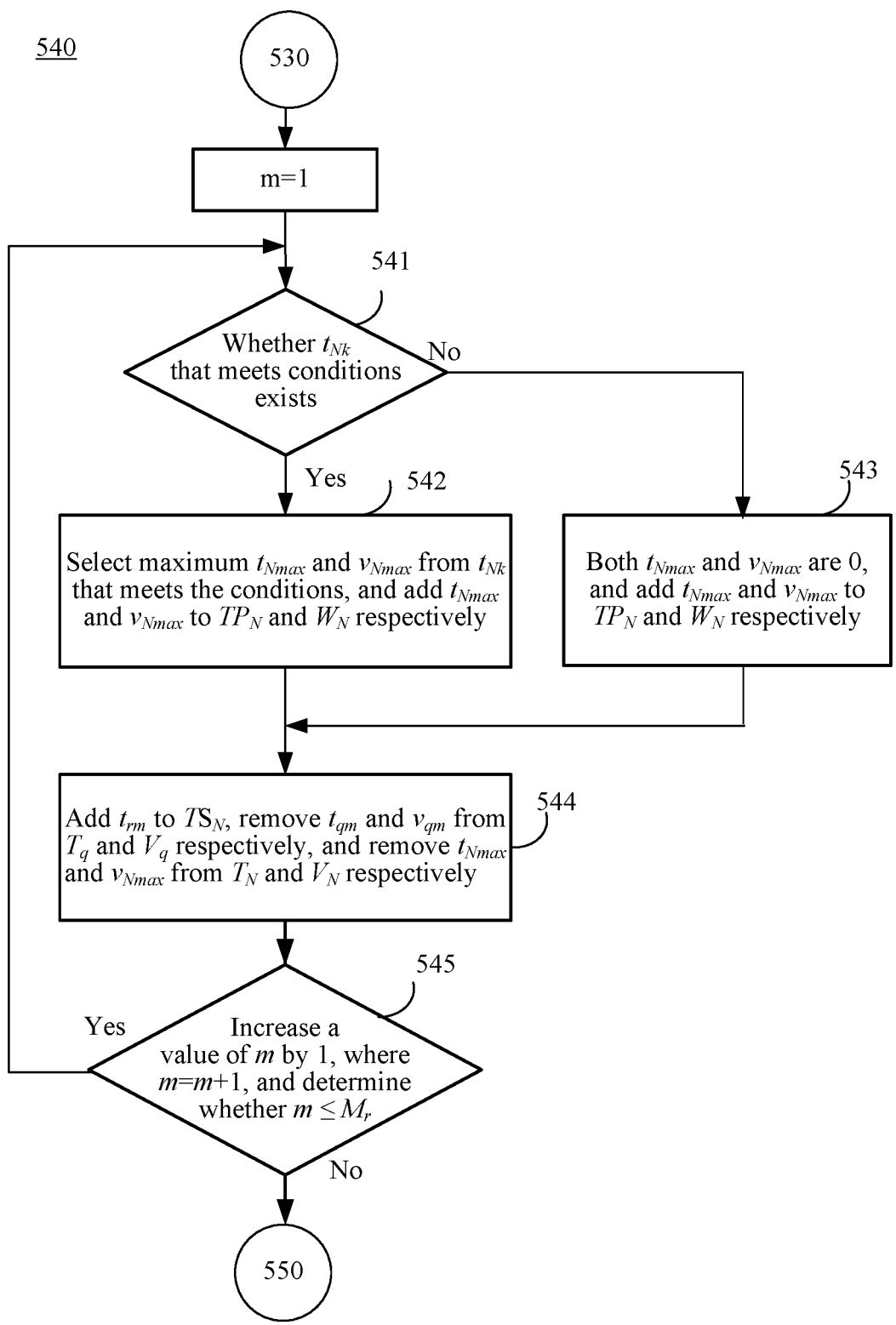
FIG. 6 is another schematic flowchart of a timeslot scheduling process for an apparatus for scheduling a timeslot according to an embodiment of the present invention.

540. For each element $t_{rm}$ (m=1, 2, . . . , $M_r$) in a transmission time set $T_r$ of a network $P_r$, execute the following process sequentially according to a sequence, as shown in FIG. 6:

traversing all elements in $T_N$, and selecting an element $t_{Nk}$ that meets the following conditions:

$t_{Nk} \leq t_{rm}$, that is, in an overlapping timeslot of N−r+1 networks, a timeslot length of the network $P_N$ cannot exceed a timeslot length at a corresponding location of the network $P_r$, where an initial value of m is 1; and $ICI_{P_q 2 P_N}(v_{qm}, v_{Nk})=0$, and $ICI_{P_N 2 P_q}(v_{Nk}, v_{qm})=0$ (where q=r, r+1, r+2, . . . , N−1, and m=1, 2, . . . , $M_r$), that is, in the overlapping timeslot of the N−r+1 networks, a network $P_q$ (q=r, r+1, r+2, . . . , N−1) does not cause interference to the network $P_N$, and the network $P_N$ does not cause interference to network $P_q$ (q=r, r+1, r+2, . . . , N−1).

541. Determine whether $t_{Nk}$ that meets the following conditions exists. If exists, execute step 542; otherwise, execute step 543.

542. Select, from all $t_{Nk}$ that meets the foregoing conditions, a maximum element, label the maximum element as $t_{Nmax}$, add $t_{Nmax}$ to a set $TP_N$, and add a corresponding number $v_{Nmax}$ to a set $W_N$.

543. If $t_{Nk}$ that meets the conditions does not exist, both $t_{Nmax}$ and $V_{Nmax}$ are 0, and add $t_{Nmax}$ and $v_{Nmax}$ to the sets $TP_N$ and $W_N$ respectively.

544. Add an element $t_{rm}$ to a set $TS_N$, and remove an element $t_{qm}$ from a set $T_q$, where (q=r, r+1, . . . , N−1), and remove an element $v_{qm}$ from a set $V_q$. Remove an element $V_q$ from a set $T_N$, and remove an element $v_{Nmax}$ from a set $V_N$ ($t_{Nmax}$ and $v_{Nmax}$ do not need to be removed when they are 0).

545. Increase a value of m by 1, that is, m=m+1, and determine whether m is less than $M_r$. If m<$M_r$, execute step 541; otherwise, execute step 550.

550. Sort remaining elements in the sets $T_N$ and $V_N$ according to an original sequence, and add all the remaining elements in $T_N$ to the output the sets $TS_N$ and $TP_N$, and add all the remaining elements in $V_N$ to the set $W_N$. That is, after all overlapping timeslots of the network $P_N$ and the network $P_n$ (n=1, 2, . . . , N−1) have been sorted, transmission is performed according to an original random sequence in a remaining timeslot of the network $P_N$.

After timeslot scheduling for the network $P_N$ is complete, the following information is obtained:

(1) The set $W_N$. Elements in the set sequentially represent numbers of links of the network $P_N$, where the links have undergone timeslot scheduling, a sequence of the elements represents an order at which corresponding links transmit data, and an element with a value being 0 represents an idle period during which no data is transmitted;

(2) The set $TP_N$. Elements in the set sequentially represent required time for transmitting actual data on each link of the network $P_N$, where the link has undergone scheduling; and (3) The set $TS_N$. Elements in the set sequentially represent transmission time of each link of the network $P_N$, where the link has undergone scheduling, where actual data is transmitted in each timeslot $tp_{Nk}$ ($tp_{Nk} \leq ts_{Nk}$), and other timeslots are idle time.

In the following, with reference to FIG. 7, an example in which there are three PBSS networks within a cluster is used to detail a process for scheduling a timeslot by the apparatus for scheduling a timeslot 200 according to an embodiment of the present invention. Timeslot scheduling of each BI on network A is implemented based on a latest BI that has already been scheduled respectively on network C and network B. Timeslot scheduling of each BI on network B is implemented based on latest BIs that have already been scheduled on network A and network C. Similarly, timeslot scheduling of each BI on network C is implemented based on latest BIs that have already been scheduled on network B and network A.

In this embodiment of the present invention, it is assumed that there are three intra-frequency PBSS networks: network A, network B, and network C. Each network has one PCP and five STAs, and it is assumed that the PCP communicates with each STA once in each BI on each network, and a link number is consistent with a STA number. It is assumed that network A performs communication 33 ms (ms) ahead of network B, and network B performs communication 33 ms (ms) ahead of network C. BI lengths of the three networks are all 100 ms, and units of the timeslot lengths are all ms.

Figure 7:
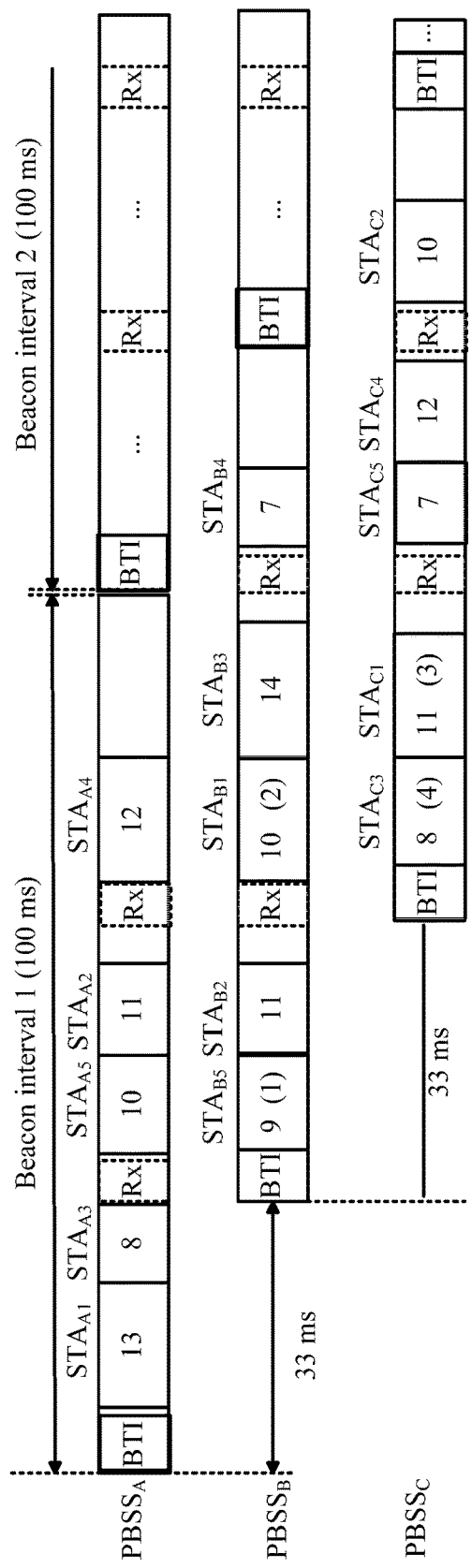
FIG. 7 is a schematic diagram of timeslot scheduling by an apparatus for scheduling a timeslot according to an embodiment of the present invention.

After allocation of timeslots of the first BIs of network A and network B separately ends, network C performs allocation according to a principle of avoiding interference timeslots of network A and network B, as shown in FIG. 7.

$P_1$, $P_2$, and $P_3$ in an algorithm are respectively labeled as A, B, and C, and input variables are sets $T_C$={7, 8, 10, 11, 12}, $V_C$={5, 3, 2, 1, 4}, $T_B$={10, 14, 7}, $V_B$={1, 3, 4}, $T_A$={12}, and $V_A$={4}. In an interference matrix related to network C, $ICI_{A2C}(4,1)=1$, $ICI_{B2C}(1,2)=1$, $ICI_{C2A}(4,4)=1$, and $ICI_{C2B}(4,3)=1$.

After scheduling the timeslots of the first BIs of network A and network B completes, each accessing timeslot of network C should meet: (1) no interference can be caused to timeslots corresponding to network A and network B, including interference caused by network C to network A and network B, and interference caused by network A and network B to network C; (2) when there is an overlapping timeslot among the three networks or between two networks, a time of a timeslot corresponding to network A or network B cannot be exceeded; (3) a timeslot that meets the foregoing two restriction conditions and has the longest duration is selected.

When network C schedules a first timeslot, it may be learned according to the interference matrix related to network C that communication between $PCP_A$ and $STA_{A4}$ on network A causes interference to communication between $PCP_C$ and $STA_{C1}$ on network C, communication between $PCP_B$ and $STA_{B1}$ on network B causes interference to communication between $PCP_C$ and $STA_{C2}$ on network C, and communication between $PCP_C$ and $STA_{C4}$ on network C causes interference to communication between $PCP_A$ and $STA_{A4}$ on network A. Therefore, $PCP_C$-$STA_{C1}$, $PCP_C$-$STA_{C2}$, and $PCP_C$-$STA_{C4}$ cannot be selected as the first timeslot of network C; instead, longest $PCP_C$-$STA_{C3}$ in remaining interference-free timeslots is selected, as shown in the figure. In this timeslot, 8 ms is used for transmitting actual data, and the remaining 4 ms are idle. After BI of network A ends, network C performs timeslot scheduling by considering only interference between network C and network B. After BI of network B ends, the remaining timeslot of network C is allocated randomly. Finally, an output link number set of network C is $W_C=\{3, 1, 5, 4, 2\}$, a transmission time set is $TS_C=\{12, 14, 7, 12, 10\}$, and an actual data transmission time set is $TP_C=\{8, 11, 7, 12, 10\}$.

After scheduling in the first BI of network C is complete, network A performs scheduling for a next BI based on a same principle, so as to avoid causing interference or timeslot collision between network B and network C. A process, similar to the foregoing process, is deduced by analogy.

If network C is accessed, and transmission in all timeslots of network A is complete, network C avoids mutual interference between network C and network B according to a timeslot scheduling algorithm between two networks. If network C is accessed, and transmission in all timeslots of network A and network B is complete, network C directly schedules each timeslot according to the original random sequence without a need to consider interference avoidance.

Figure 8:
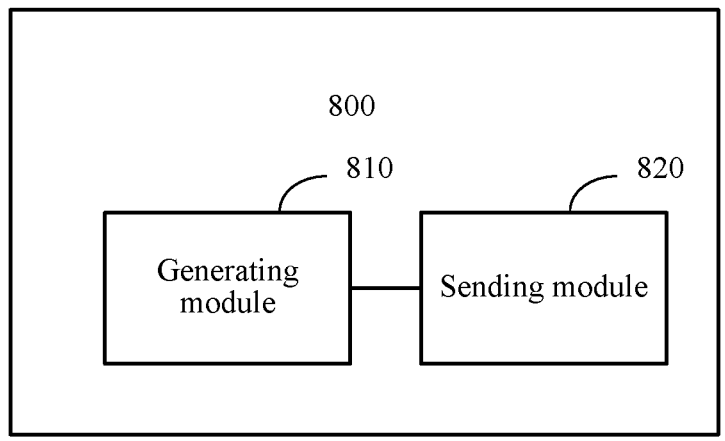
FIG. 8 is a schematic block diagram of an apparatus for scheduling a timeslot according to an embodiment of the present invention.

FIG. 8 is a schematic block diagram of an apparatus 800 for scheduling a timeslot according to another embodiment of the present invention. The apparatus 800 includes: a generating module 810 and a sending module 820.

The generating module 810 is configured to generate interference measurement indication information.

The sending module 820 is configured to send the interference measurement indication information to a first BSS and at least one second BSS, where the interference measurement indication information is used to indicate a PCP or an AP of each of the first BSS and the at least one second BSS to send channel quality measurement request information to a STA of the respective BSS, and the first BSS and the at least one second BSS belong to a same cluster.

The apparatus 800 may be a synchronization PCP or may be a synchronization AP.

Therefore, the apparatus for scheduling a timeslot in this embodiment of the present invention sends the interference measurement indication information to all links of all networks in a cluster, so that all the networks in the cluster learn complete interference information about a STA in two statuses, that is, the STA serves as an interfering party and as an interfered-with party. In this way, interference to a link of another network can be avoided actively, and a timeslot can be scheduled properly.

Specifically, in this embodiment of the present invention, the interference measurement indication information is indicated by a spatial sharing measurement enable field in a clustering control field that is carried in a DMG beacon frame, where the spatial sharing measurement enable field is used to enable a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

Alternatively, in this embodiment of the present invention, the interference measurement indication information is a Media Access Control MAC element, and the MAC element includes a cluster spatial sharing enable field that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

Figure 9:
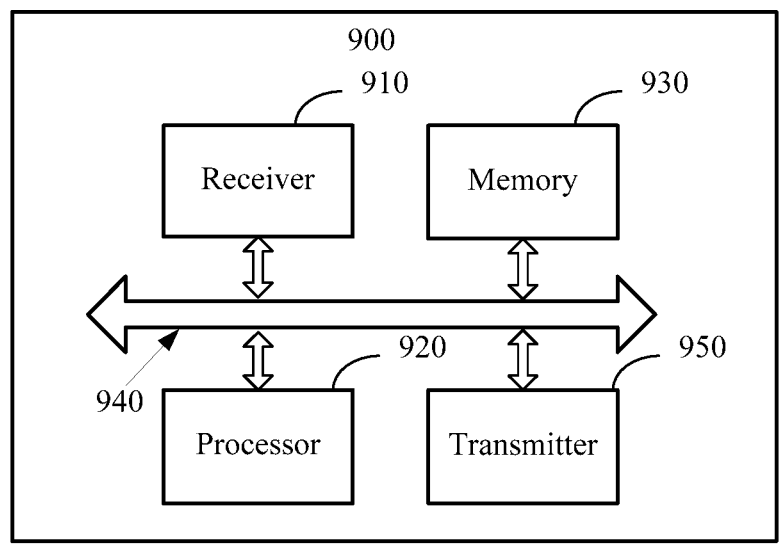
FIG. 9 is a schematic block diagram of an apparatus for scheduling a timeslot according to another embodiment of the present invention.

FIG. 9 is a schematic block diagram of an apparatus 900 for scheduling a timeslot according to an embodiment of the present invention. The apparatus 900 includes a receiver 910, a processor 920, a memory 930, and a bus 940.

The receiver 910 is configured to: acquire first interference information, where the first interference information is used to determine whether a link/links of a first basic service set BSS experiences interference from a link/links of at least one second BSS; acquire second interference information, where the second interference information is used to determine whether a link of the at least one second BSS experiences interference from a link of the first BSS; and acquire timeslot scheduling information of a link of the at least one second BSS, where the timeslot scheduling information is used to indicate information about a scheduled timeslot of the link of the at least one second BSS. The processor 920 calls, by using the bus 940, code stored in the memory 930, so as to schedule a timeslot for a link of the first BSS according to the first interference information, the second interference information, and the timeslot scheduling information, so that the link of the first BSS and the link of the at least one second BSS are not interfered with each other when communication is performed in a same timeslot.

Optionally, in another embodiment, the apparatus 900 further includes a transmitter 950, configured to notify the first interference information to a personal basis service set control point PCP or an access point AP of the at least one second BSS.

Optionally, in another embodiment, the transmitter 950 is specifically configured to send, to the at least one second BSS, a directional multi-gigabit DMG beacon frame that includes the first interference information.

According to this embodiment of the present invention, the processor 920 determines, according to the first interference information, the second interference information, and a first timeslot that has been scheduled for a link of the at least one second BSS, at least one candidate link from a link of the first BSS, for which timeslot scheduling has not been performed, where the at least one candidate link and the link of the at least one second BSS, for which the first timeslot has been scheduled, are not interfered with each other; selects a first link from the at least one candidate link, where an actual transmission timeslot corresponding to the first link is a longest timeslot that is less than the first timeslot among an actual transmission timeslot corresponding to the at least one candidate link; and schedules a timeslot of the first BSS that overlaps the first timeslot as a timeslot of the first link.

According to this embodiment of the present invention, the first BSS is a BSS for which timeslot scheduling is to be performed within current beacon frame duration, the at least one second BSS is a BSS for which timeslot scheduling is performed before the first BSS and for which timeslot scheduling has been performed within the current beacon frame duration, and the processor 920 is specifically configured to: execute the following iteration process for N−1 BSSs in the at least one second BSS until r=N, where an initial value of r is 1:

determining, according to the timeslot scheduling information, the $m_r^{th}$ scheduled timeslot of the $r^{th}$ BSS in the N−1 BSSs, where $m_r=M_{r-1}+1, M_{r-1}+2, \ldots, M_r$, $M_r$ is less than or equal to $K_r$, $K_r$ is a quantity of links of the $r^{th}$ BSS, $M_r$ is a quantity of scheduled timeslots of the $r^{th}$ BSS that overlap timeslots of the $N^{th}$ BSS and $M_0$=0, and the $N^{th}$ BSS is the first BSS;

determining, according to the first interference information and the second interference information, at least one candidate link from a link of the $N^{th}$ BSS, for which timeslot scheduling has not been performed, where the at least one candidate link and the $m_r^{th}$ link of the $r^{th}$ BSS to the $(N-1)^{th}$ BSS are not interfered with each other;

selecting a link with a longest timeslot time from the at least one candidate link as an optimal link, where an actual transmission timeslot corresponding to the optimal link is less than or equal to the $m_r^{th}$ scheduled timeslot;

scheduling the $m_r^{th}$ timeslot of the $N^{th}$ BSS as a timeslot of the optimal link, where the $m_r^{th}$ timeslot overlaps the $m_r^{th}$ scheduled timeslot of the $r^{th}$ BSS; and increasing a value of r by 1.

Optionally, in another embodiment, if the at least one candidate link does not exist, the processor 920 is further configured to cause the $N^{th}$ BSS not to transmit data in the $m_r^{th}$ scheduled timeslot.

Optionally, in another embodiment, the first BSS is a BSS for which timeslot scheduling is to be performed within current beacon frame duration, the at least one second BSS is a BSS for which timeslot scheduling has been performed within the current beacon frame duration, and the processor 920 is further configured to: determine, according to the timeslot scheduling information, x overlapping timeslots of the first BSS and the at least one second BSS; and execute the following iteration process until z is greater than x, where an initial value of z is 1: traversing actual transmission timeslots required by y links of the first BSS, for which a timeslot is not scheduled, and scheduling a timeslot for the link of the first BSS according to the first interference information, the second interference information, and the timeslot scheduling information of the link of the at least one second BSS, so that the $p^{th}$ link of the first BSS, on which communication is performed in the $z^{th}$ overlapping timeslot of the x overlapping timeslots, and a link of the at least one second BSS, on which communication is performed in the $z^{th}$ overlapping timeslot, are not interfered with each other, and an actual transmission timeslot of the $p^{th}$ link of the first BSS is less than or equal to the $z^{th}$ overlapping timeslot; and decreasing a value of y by 1 and increasing a value of z by 1.

Optionally, in another embodiment, the processor 920 is further configured to: after the iteration process ends, schedule a timeslot for a remaining link of the first BSS, for which a timeslot is not scheduled, so that transmission is performed according to a random sequence on the remaining link of the first BSS, for which a timeslot is not scheduled.

Optionally, in another embodiment, the apparatus 900 further includes a transmitter 950, configured to send channel quality measurement request information to a user station STA of the first BSS, where the channel quality measurement request information is used to indicate the STA to perform channel quality measurement within a specified time period. The receiver 910 receives channel quality measurement report information sent by the STA, where the channel quality measurement report information is used to indicate a measurement result of channel quality of the STA; and the processor 920 determines the first interference information according to the measurement result.

PCPs or APs of the first BSS and the at least one second BSS belong to a same cluster, and before the first interference information is acquired, the receiver 910 is further configured to receive interference measurement indication information that is sent by a synchronization PCP or a synchronization AP within a cluster to which the first BSS and the at least one second BSS belong, where the interference measurement indication information is used to indicate a PCP or an AP of each of the first BSS and the at least one second BSS to send the channel quality measurement request information to a STA of the respective BSS.

According to this embodiment of the present invention, the interference measurement indication information is indicated by a spatial sharing measurement enable field in a clustering control field that is carried in a DMG beacon frame, where the spatial sharing measurement enable field is used to enable a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

According to this embodiment of the present invention, the interference measurement indication information is a Media Access Control MAC element, and the MAC element includes cluster spatial sharing enable that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

According to this embodiment of the present invention, the receiver 910 is configured to receive the second interference information sent by the PCP/AP of the at least one second BSS.

According to this embodiment of the present invention, the first interference information and the second interference information are SP sharing report elements of a MAC element format, where the SP spatial sharing report element includes an interference-free link field, and the interference-free link field includes an identifier of a BSS in which a measured transmission link is located, association addresses of a source STA and a target STA that perform SP transmission, and association addresses of a source STA and a target STA that perform channel quality measurement.

Figure 10:
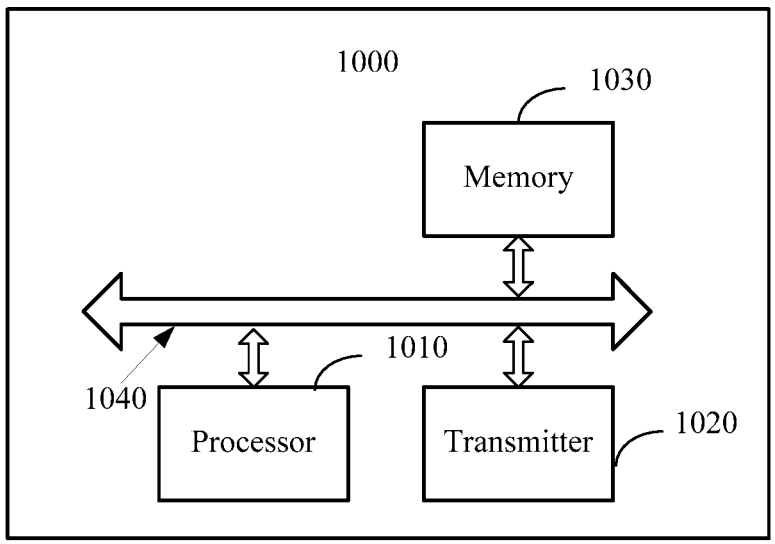
FIG. 10 is a schematic block diagram of an apparatus for scheduling a timeslot according to another embodiment of the present invention.

FIG. 10 is a schematic block diagram of an apparatus 1000 for scheduling a timeslot according to another embodiment of the present invention. The apparatus 1000 includes: a processor 1010, a transmitter 1020, a memory 1030, and a bus 1040.

The processor 1010 calls, by using the bus 1040, code stored in the memory 1030, so as to generate interference measurement indication information; the transmitter 1020 is configured to send the interference measurement indication information to a first BSS and at least one second BSS, where the interference measurement indication information is used to indicate a PCP or an AP of each of the first BSS and the at least one second BSS to send channel quality measurement request information to a STA of the respective BSS, and the first BSS and the at least one second BSS belong to a same cluster.

According to this embodiment of the present invention, the apparatus 1000 may be a synchronization PCP or may be a synchronization AP.

Therefore, the apparatus for scheduling a timeslot in this embodiment of the present invention sends the interference measurement indication information to all links of all networks in a cluster, so that all the networks in the cluster learn complete interference information about a STA in two statuses, that is, the STA serves as an interfering party and as an interfered-with party. In this way, interference to a link of another network can be avoided actively, and a timeslot can be scheduled properly.

Specifically, in this embodiment of the present invention, the interference measurement indication information is indicated by a spatial sharing measurement enable field in a clustering control field that is carried in a DMG beacon frame, where the spatial sharing measurement enable field is used to enable a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

Alternatively, in this embodiment of the present invention, the interference measurement indication information is a Media Access Control MAC element, and the MAC element includes a cluster spatial sharing enable field that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

In the foregoing, the apparatus for scheduling a timeslot according to the embodiments of the present invention is described in detail with reference to FIG. 1 to FIG. 10. In the following, a method for scheduling a timeslot according to the embodiments of the present invention is described in detail with reference to FIG. 11 to FIG. 13.

Figure 11:
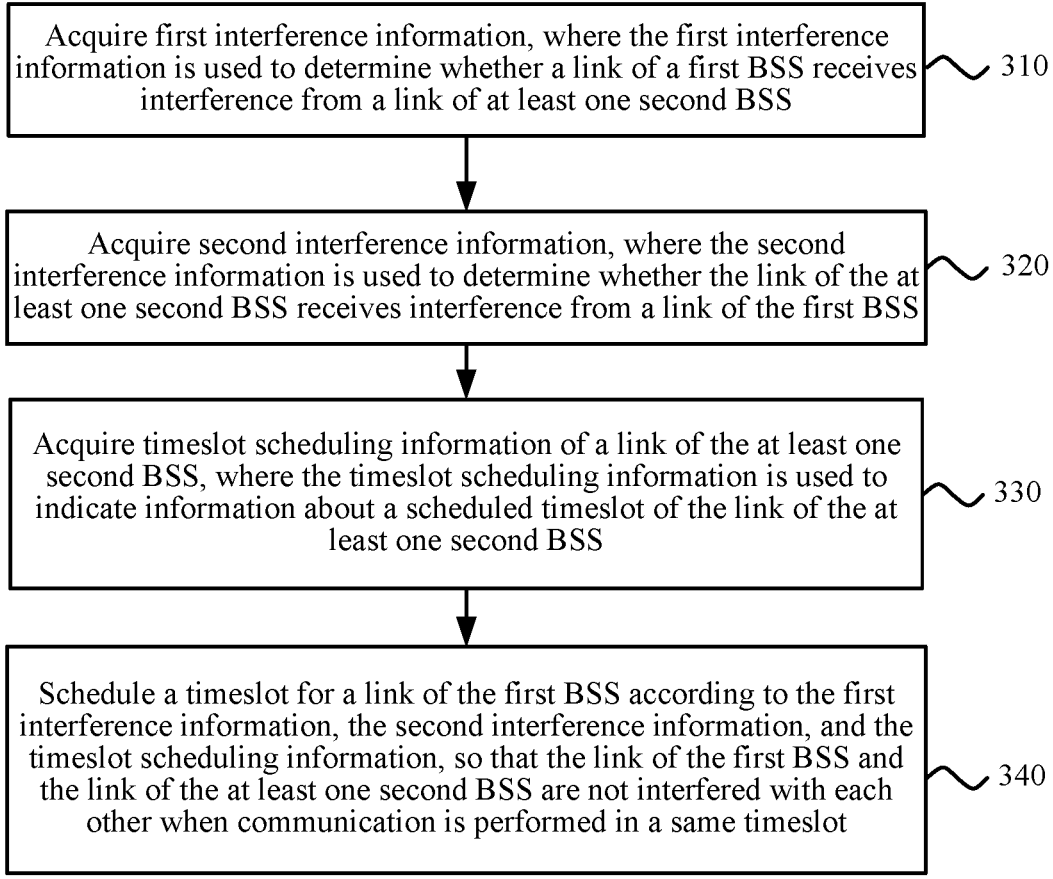
FIG. 11 is a schematic flowchart of a method for scheduling a timeslot according to an embodiment of the present invention.

FIG. 11 is a schematic block diagram of a method for scheduling a timeslot according to an embodiment of the present invention. The embodiment of FIG. 11 is executed by the apparatus of FIG. 2. The method for scheduling a timeslot includes:

310. Acquire first interference information, where the first interference information is used to determine whether a link/links of a first BSS experiences interference from a link/links of at least one second BSS.

320. Acquire second interference information, where the second interference information is used to determine whether the link of the at least one second BSS experiences interference from a link of the first BSS.

330. Acquire timeslot scheduling information of a link of the at least one second BSS, where the timeslot scheduling information is used to indicate information about a scheduled timeslot of the link of the at least one second BSS.

340. Schedule a timeslot for a link of the first BSS according to the first interference information, the second interference information, and the timeslot scheduling information, so that the link of the first BSS and the link of the at least one second BSS are not interfered with each other when communication is performed in a same timeslot.

Therefore, according to the apparatus for scheduling a timeslot in this embodiment of the present invention, complete interference information about all links on a PCP/AP network in two statuses, that is, the links serve as interfering parties and as interfered-with parties, is acquired, so that inter-network link interference can be avoided when timeslot scheduling is performed, which effectively improves data throughputs of networks.

Optionally, in this embodiment of the present invention, the method for scheduling a timeslot further includes:

notifying the first interference information to a personal basis service set control point PCP or an access point AP of the at least one second BSS.

Specifically, in this embodiment of the present invention, the notifying the first interference information to a personal basis service set control point PCP or an access point AP of the at least one second BSS includes: sending, to the at least one second BSS, a directional multi-gigabit DMG beacon frame that includes the first interference information.

Figure 12:
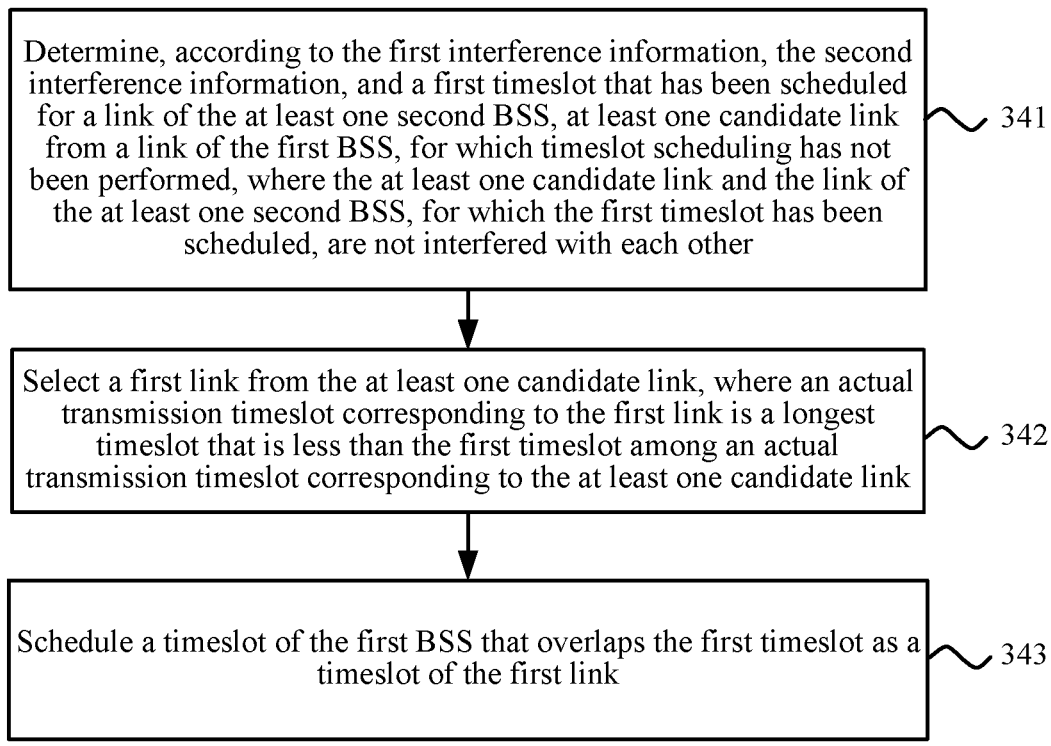
FIG. 12 is another schematic flowchart of a method for scheduling a timeslot according to an embodiment of the present invention.

Optionally, in this embodiment of the present invention, as shown in FIG. 12, 340 includes:

341. Determine, according to the first interference information, the second interference information, and a first timeslot that has been scheduled for a link of the at least one second BSS, at least one candidate link from a link of the first BSS, for which timeslot scheduling has not been performed, where the at least one candidate link and the link of the at least one second BSS, for which the first timeslot has been scheduled, are not interfered with each other.

342. Select a first link from the at least one candidate link, where an actual transmission timeslot corresponding to the first link is a longest timeslot that is less than the first timeslot among an actual transmission timeslot corresponding to the at least one candidate link.

343. Schedule a timeslot of the first BSS that overlaps the first timeslot as a timeslot of the first link.

Specifically, in this embodiment of the present invention, the first BSS is a BSS for which timeslot scheduling is to be performed within current beacon frame duration, the at least one second BSS is a BSS for which timeslot scheduling is performed before the first BSS and for which timeslot scheduling has been performed within the current beacon frame duration, and 340 further includes:

executing the following iteration process for N−1 BSSs in the at least one second BSS until r=N, where an initial value of r is 1:

determining, according to the timeslot scheduling information, the $m_r^{th}$ scheduled timeslot of the $r^{th}$ BSS in the N−1 BSSs, where $m_r = M_{r-1}+1, M_{r-1}+2, \ldots, M_r$, $M_r$ is less than or equal to $K_r$, $K_r$ is a quantity of links of the $r^{th}$ BSS, $M_r$ is a quantity of scheduled timeslots of the $r^{th}$ BSS that overlap timeslots of the $N^{th}$ BSS and $M_0=0$, and the $N^{th}$ BSS is the first BSS;

determining, according to the first interference information and the second interference information, at least one candidate link from a link of the $N^{th}$ BSS, for which timeslot scheduling has not been performed, where the at least one candidate link and the $m_r^{th}$ link of the $r^{th}$ BSS to the $(N-1)^{th}$ BSS are not interfered with each other;

selecting a link with a longest timeslot time from the at least one candidate link as an optimal link, where an actual transmission timeslot corresponding to the optimal link is less than or equal to the $m_r^{th}$ scheduled timeslot;

scheduling the $m_r^{th}$ timeslot of the $N^{th}$ BSS as a timeslot of the optimal link, where the $m_r^{th}$ timeslot overlaps the $m_r^{th}$ scheduled timeslot of the $r^{th}$ BSS; and increasing a value of r by 1.

Optionally, in this embodiment of the present invention, the method for scheduling a timeslot further includes: if the at least one candidate link does not exist, causing the $N^{th}$ BSS not to transmit data in the $m_y^{th}$ scheduled timeslot.

Alternatively, in this embodiment of the present invention, in 340, the first BSS is a BSS for which timeslot scheduling is to be performed within current beacon frame duration, the at least one second BSS is a BSS for which timeslot scheduling has been performed within the current beacon frame duration, and 340 includes:

determining, according to the timeslot scheduling information, x overlapping timeslots of the first BSS and the at least one second BSS; and executing the following iteration process until z is greater than x, where an initial value of z is 1: traversing actual transmission timeslots required by y links of the first BSS, for which a timeslot is not scheduled, and scheduling a timeslot for the link of the first BSS according to the first interference information, the second interference information, and the timeslot scheduling information of the link of the at least one second BSS, so that the $p^{th}$ link of the first BSS, on which communication is performed in the $z^{th}$ overlapping timeslot of the x overlapping timeslots, and a link of the at least one second BSS, on which communication is performed in the $z^{th}$ overlapping timeslot, are not interfered with each other, and an actual transmission timeslot of the $p^{th}$ link of the first BSS is less than or equal to the $z^{th}$ overlapping timeslot; and decreasing a value of y by 1 and increasing a value of z by 1.

Further, in this embodiment of the present invention, after the iteration process ends, a timeslot is scheduled for a remaining link of the first BSS, for which a timeslot is not scheduled, so that transmission is performed according to a random sequence on the remaining link of the first BSS, for which a timeslot is not scheduled.

In this embodiment of the present invention, in 310, the acquiring first interference information includes:

sending channel quality measurement request information to a user station STA of the first BSS, where the channel quality measurement request information is used to indicate the STA to perform channel quality measurement within a specified time period;

receiving channel quality measurement report information sent by the STA, where the channel quality measurement report information is used to indicate a measurement result of channel quality of the STA; and determining the first interference information according to the measurement result.

Optionally, in this embodiment of the present invention, the first BSS and the at least one second BSS belong to a same cluster, and before the acquiring first interference information, the method for scheduling a timeslot further includes:

receiving interference measurement indication information that is sent by a synchronization PCP or a synchronization AP within the cluster in which the first BSS and the at least one second BSS are located, where the interference measurement indication information is used to indicate a PCP or an AP of each of the first BSS and the at least one second BSS to send the channel quality measurement request information to a STA of the respective BSS.

Specifically, in this embodiment of the present invention, the interference measurement indication information is indicated by a spatial sharing measurement enable field in a clustering control field that is carried in a DMG beacon frame, where the spatial sharing measurement enable field is used to indicate a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

Alternatively, in this embodiment of the present invention, the interference measurement indication information is a Media Access Control MAC element, and the MAC element includes cluster spatial sharing enable that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

Specifically, in this embodiment of the present invention, the acquiring second interference information includes:

receiving the second interference information that is sent by the PCP/AP of the at least one second BSS.

Specifically, in this embodiment of the present invention, the first interference information and the second interference information are SP sharing report elements of a MAC element format, where the SP spatial sharing report element includes an interference-free link field, and the interference-free link field includes an identifier of a BSS in which a measured transmission link is located, association addresses of a source STA and a target STA that perform SP transmission, and association addresses of a source STA and a target STA that perform channel quality measurement.

It should be understood that, the method for scheduling a timeslot in this embodiment of the present invention may be corresponding to the apparatus 200 for scheduling a timeslot in this embodiment of the present invention, and corresponding procedures of this method are separately used to implement the foregoing and other operations and/or functions of the modules of the corresponding apparatus 200. For brevity, details are not described herein again.

Therefore, according to the method for scheduling a timeslot in this embodiment of the present invention, complete interference information about all links on a PCP/AP network in two statuses, that is, the links serve as interfering parties and as interfered-with parties, is acquired, so that inter-network link interference can be avoided when timeslot scheduling is performed, which effectively improves data throughputs of networks.

In the following, a method for scheduling a timeslot according to another embodiment of the present invention is described with reference to FIG. 13.

Figure 13:
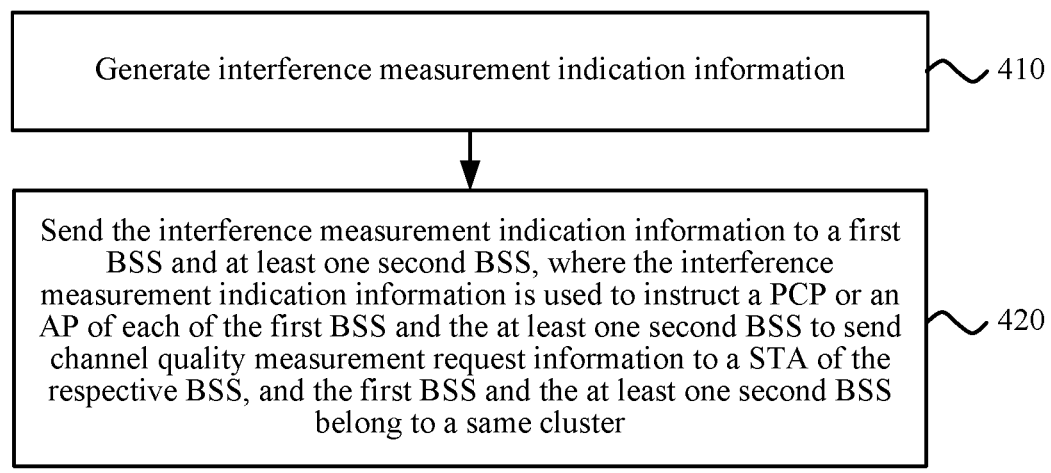
FIG. 13 is a schematic flowchart of a method for scheduling a timeslot according to another embodiment of the present invention.

FIG. 13 is a schematic flowchart of the method for scheduling a timeslot according to another embodiment of the present invention. The embodiment of FIG. 13 is executed by the apparatus of FIG. 8. The method includes:

410. Generate interference measurement indication information.

420. Send the interference measurement indication information to a first BSS and at least one second BSS, where the interference measurement indication information is used to indicate a PCP or an AP of each of the first BSS and the at least one second BSS to send channel quality measurement request information to a STA of the respective BSS, and the first BSS and the at least one second BSS belong to a same cluster.

Therefore, according to the method for scheduling a timeslot in this embodiment of the present invention, the interference measurement indication information is sent to all links of all networks in a cluster, so that all the networks in the cluster learn complete interference information about a STA in two statuses, that is, the STA serves as an interfering party and as an interfered-with party. In this way, interference to a link of another network can be avoided actively, and a timeslot can be scheduled properly.

Specifically, in this embodiment of the present invention, the interference measurement indication information is indicated by a spatial sharing measurement enable field in a clustering control field that is carried in a directional multi-gigabit DMG beacon frame, where the spatial sharing measurement enable field is used to indicate a service period SP spatial sharing mechanism between the first BSS and the at least one second BSS, or is used to disable an SP spatial sharing mechanism between the first BSS and the at least one second BSS, so that the PCPs or the APs of the first BSS and the at least one second BSS indicate the STAs of the respective BSSs to perform channel quality measurement.

Alternatively, in this embodiment of the present invention, the interference measurement indication information is a Media Access Control MAC element, and the MAC element includes cluster spatial sharing enable that is used to enable a service period SP spatial sharing mechanism between the first BSS and the at least one second BSS or that is used to disable an SP spatial sharing mechanism between the first BSS and the at least one second BSS, so that the PCPs or the APs of the first BSS and the at least one second BSS indicate the STAs of the respective BSSs to perform channel quality measurement.

Therefore, according to the method for scheduling a timeslot in this embodiment of the present invention, the interference measurement indication information is sent to all links of all networks in a cluster, so that all the networks in the cluster learn complete interference information about a STA in two statuses, that is, the STA serves as an interfering party and as an interfered-with party. In this way, interference to a link of another network can be avoided actively, and a timeslot can be scheduled properly.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of the present invention, "B corresponding to A" indicates B is associated with A, and B may be determined according to A. However, it should further be understood that, B is determined according to A does not means that B is determined according to only A, and B may be further determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With description of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, is the foregoing descriptions are merely exemplary embodiments of the technical solutions of the present invention, but are not intended to limit the protection scope of the present invention. Any modification, equivalent replacement, or improvement made without departing from the spirit and principle of the present invention shall fall within the protection scope of the present invention.

What is claimed is:

1. An apparatus for scheduling a timeslot, comprising:
   a processor, configured to acquire first interference information for determining whether a link of a first basic service set (BSS) experiences interference from a link of at least one second BSS;
   a receiver, configured to acquire second interference information for determining whether the link of the at least one second BSS experiences interference from the link of the first BSS;
   wherein the processor is further configured to:
      acquire timeslot scheduling information of the link of the at least one second BSS, wherein the timeslot scheduling information indicates information about a scheduled timeslot of the link of the at least one second BSS; and
      schedule a timeslot for the link of the first BSS according to the first interference information, the second interference information, and the timeslot scheduling information, so that the link of the first BSS and the link of the at least one second BSS do not interfere with each other when communication is performed in a same timeslot;
   wherein the receiver is further configured to receive interference measurement indication information from a synchronization personal basis service set control point (PCP) or a synchronization access point (AP) within a cluster to which the first BSS and the at least one second BSS belong, wherein the interference measurement indication information indicates that a PCP or an AP of each of the first BSS and the at least one second BSS is to send channel quality measurement request information to a user station (STA) of the respective BSS, and wherein PCPs or APs of the first BSS and the at least one second BSS belong to a same cluster;
   wherein the interference measurement indication information is carried in a Media Access Control (MAC) element, and the MAC element comprises a cluster spatial sharing enable field that enables or disables a service period (SP) spatial sharing mechanism between the first BSS and the at least one second BSS.

2. The apparatus according to claim 1, further comprising:
   a transmitter, configured to transmit the first interference information to a PCP or an AP of the at least one second BSS.

3. The apparatus according to claim 1, wherein the apparatus further comprises:
   a transmitter, configured to send the channel quality measurement request information to a STA of the first BSS, wherein the channel quality measurement request information indicates that the STA of the first BSS is to perform channel quality measurement within a specified time period; and
   wherein the receiver is further configured to receive channel quality measurement report information from the STA of the first BSS wherein the channel quality measurement report information indicates a measurement result of channel quality of the STA of the first BSS; and
   wherein the processor is configured to determine the first interference information according to the measurement result.

4. The apparatus according to claim 1, wherein the receiver is configured to receive the second interference information from a PCP or an AP of the at least one second BSS.

5. The apparatus according to claim 1, wherein the first interference information and the second interference information are SP spatial sharing report elements of a MAC frame format, wherein each SP spatial sharing report element comprises an interference-free link field, and the interference-free link field comprises an identifier of a BSS in which a measured transmission link is located, association addresses of a source STA and a target STA that perform SP transmission, and association addresses of a source STA and a target STA that perform channel quality measurement.

6. A method for scheduling a timeslot, comprising:
   acquiring, by an apparatus, first interference information for determining whether a link of a first basic service set (BSS) experiences interference from a link of at least one second BSS;
   acquiring, by the apparatus, second interference information for determining whether the link of the at least one second BSS experiences interference from the link of the first BSS;
   acquiring, by the apparatus, timeslot scheduling information of the link of the at least one second BSS, wherein the timeslot scheduling information indicates information about a scheduled timeslot of the link of the at least one second BSS; and
   scheduling, by the apparatus, a timeslot for the link of the first BSS according to the first interference information, the second interference information, and the timeslot scheduling information, so that the link of the first BSS and the link of the at least one second BSS do not interfere with each other when communication is performed in a same timeslot;
   wherein before acquiring the first interference information, the method further comprises: receiving interference measurement indication information from a synchronization personal basis service set control point (PCP) or a synchronization access point (AP) within a cluster to which the first BSS and the at least one second BSS belong, wherein the interference measurement indication information indicates that a PCP or an AP of each of the first BSS and the at least one second BSS are to send channel quality measurement request information to a user station (STA) of the respective BSS, and wherein PCPs or APs of the first BSS and the at least one second BSS belong to a same cluster;
   wherein the interference measurement indication information is carried in a Media Access Control (MAC) element, and the MAC element comprises a cluster spatial sharing enable field that enables or disables a service period (SP) spatial sharing mechanism between the first BSS and the at least one second BSS.

7. The method according to claim 6, further comprising:
   transmitting the first interference information to a PCP or an AP of the at least one second BSS.

8. The method according to claim 6, wherein before acquiring the first interference information, the method further comprises:
   sending the channel quality measurement request information to a STA of the first BSS, wherein the channel quality measurement request information indicates that the STA of the first BSS is to perform channel quality measurement within a specified time period; and
   receiving channel quality measurement report information from the STA of the first BSS wherein the channel quality measurement report information indicates a measurement result of channel quality of the STA of the first BSS; and wherein acquiring the first interference information comprises determining the first interference information according to the measurement result.

9. The method according to claim 6, wherein acquiring the second interference information comprises:

receiving the second interference information from a PCP or an AP of the at least one second BSS.

10. The method according to claim 6, wherein the first interference information and the second interference information are SP spatial sharing report elements of a MAC element format, wherein each SP spatial sharing report element comprises an interference-free link field, and the interference-free link field comprises an identifier of a BSS in which a measured transmission link is located, association addresses of a source STA and a target STA that perform SP transmission, and association addresses of a source STA and a target STA that perform channel quality measurement.

11. An apparatus for scheduling a timeslot, comprising a processor and a memory, wherein the memory is configured to provide instructions for the processor, and wherein, based on the instructions, the processor is configured to perform the following steps:

acquiring interference measurement indication information from a synchronization personal basis service set control point (PCP) or a synchronization access point (AP) within a cluster to which a first basic service set (BSS) and at least one second BSS belong, wherein the interference measurement indication information indicates that a PCP or an AP of each of the first BSS and the at least one second BSS is to send channel quality measurement request information to a user station (STA) of the respective BSS, and wherein PCPs or APs of the first BSS and the at least one second BSS belong to a same cluster;

acquiring first interference information for determining whether a link of the first BSS experiences interference from a link of the at least one second BSS;

acquiring first interference information for determining whether a link of the first BSS experiences interference from a link of the at least one second BSS;

acquiring second interference information for determining whether the link of the at least one second BSS experiences interferences from the link of the first BSS;

acquiring timeslot scheduling information of the link of the at least one second BSS, wherein the timeslot scheduling information indicates information about a scheduled timeslot of the link of the at least one second BSS; and scheduling a timeslot for the link of the first BSS according to the first interference information, the second interference information, and the timeslot scheduling information, so that the link of the first BSS and the link of the at least one second BSS do not interfere with each other when communication is performed in a same timeslot;

wherein the interference measurement indication information is carried in a Media Access Control (MAC) element, and the MAC element comprises a cluster spatial sharing enable field that enables or disables a service period (SP) spatial sharing mechanism between the first BSS and the at least one second BSS.

12. The apparatus according to claim 11, wherein the processor is further configured to transmit the first interference information to a PCP or an AP of the at least one second BSS.

13. The apparatus according to claim 11, wherein the processor is further configured to:

send the channel quality measurement request information to a STA of the first BSS, wherein the channel quality measurement request information indicates that the STA of the first BSS is to perform channel quality measurement within a specified time period; and receive channel quality measurement report information from the STA of the first BSS, wherein the channel quality measurement report information indicates a measurement result of channel quality of the STA or the first BSS;

wherein the processor is configured to determine the first interference information according to the measurement result.

14. The apparatus according to claim 11, wherein the first interference information and the second interference information are SP spatial sharing report elements of a MAC frame format, wherein each SP spatial sharing report element comprises an interference-free link field, and the interference-free link field comprises an identifier of a BSS in which a measured transmission link is located, association addresses of a source STA and a target STA that perform SP transmission, and association address of a source STA and a target STA that perform channel quality measurement.

* * * * *

UNITED STATES PATENT AND TRADEMARK OFFICE
CERTIFICATE OF CORRECTION

PATENT NO. : 10,314,064 B2
APPLICATION NO. : 15/200653
DATED : June 4, 2019
INVENTOR(S) : Feng et al.

Page 1 of 1

It is certified that error appears in the above-identified patent and that said Letters Patent is hereby corrected as shown below:

In the Claims

Claim 11, Column 33, Line 38-Line 43: "acquiring first interference information for determining whether a link of the first BSS experiences interference from a link of the at least one second BSS; acquiring first interference information for determining whether a link of the first BSS experiences interference from a link of the at least one second BSS;" should read -- acquiring first interference information for determining whether a link of the first BSS experiences interference from a link of the at least one second BSS; --.

Claim 13, Column 34, Line 32-Line 33: "STA or the first BSS" should read -- STA of the first BSS --.

Claim 14, Column 34, Line 46: "address of a source STA" should read -- addresses of a source STA --.

Signed and Sealed this
Third Day of March, 2020

Andrei Iancu
*Director of the United States Patent and Trademark Office*